United States Patent [19]

Johnson et al.

[11] Patent Number: 5,768,620
[45] Date of Patent: Jun. 16, 1998

[54] VARIABLE TIMEOUT METHOD IN A MISSING-INTERRUPT-HANDLER FOR I/O REQUESTS ISSUED BY THE SAME OPERATING SYSTEM

[75] Inventors: Gavin Stuart Johnson, Aromas, Calif.; Richard Anthony Ripberger, Tucson, Ariz.; Luis Ricardo Urbanejo, Morgan Hill, Calif.; Harry Morris Yudenfriend, Poughkeepsie, N.Y.

[73] Assignee: International Business Machines Corporation, Armonk, N.Y.

[21] Appl. No.: 631,689

[22] Filed: Apr. 9, 1996

[51] Int. Cl.⁶ .................................................. G06F 13/00
[52] U.S. Cl. .............. 395/835; 395/183.19; 395/184.01; 395/185.08; 395/868; 371/3; 371/48; 371/62
[58] Field of Search ................... 371/3, 48, 62; 395/182.04, 182.14, 183.19, 184.01, 185.08, 553, 825, 835, 857, 868, 883

[56] References Cited

U.S. PATENT DOCUMENTS

| | | | |
|---|---|---|---|
| 4,371,932 | 2/1983 | Dinwiddie, Jr. et al. | 364/200 |
| 4,525,800 | 7/1985 | Hamerla | 395/182.04 |
| 4,751,634 | 6/1988 | Burrus, Jr. et al. | 395/883 |
| 4,771,403 | 9/1988 | Maskovyak et al. | 364/900 |
| 4,812,968 | 3/1989 | Poole | 395/857 |
| 4,974,147 | 11/1990 | Hanrahan et al. | 364/200 |
| 5,003,462 | 3/1991 | Blaner et al. | 364/200 |
| 5,220,660 | 6/1993 | Yoshizawa et al. | 395/553 |
| 5,257,368 | 10/1993 | Benson et al. | 395/600 |
| 5,257,379 | 10/1993 | Cwiakala et al. | 395/700 |
| 5,307,482 | 4/1994 | Bealkowski et al. | 395/575 |
| 5,333,274 | 7/1994 | Amini et al. | 395/275 |
| 5,388,254 | 2/1995 | Betz et al. | 395/182.14 |
| 5,687,390 | 11/1997 | McMillan, Jr. | 395/825 |
| 5,699,511 | 12/1997 | Porcaro et al. | 395/185.08 |

Primary Examiner—Thomas C. Lee
Assistant Examiner—Po C. Huang
Attorney, Agent, or Firm—Bernard M. Goldman

[57] ABSTRACT

Missing interrupt handler (MIH) internal software features support a variable MIH timeout for I/O requests issued by an operating system (OS), when the same OS is involved with both an executing I/O request and a waiting I/O request. The OS varies its MIH timeout period without a signal from any I/O entity to prevent a false indication of a potential failure in a current I/O device operation. If a current I/O request has not completed when the OS senses the end of a primary MIH timeout period, started when issuing that request, the OS then scans the I/O program of that I/O request for any contained long-running command. (Most I/O requests complete during their primary MIH timeout period.) If a long command is found, the OS extends the MIH timeout period from the primary MIH timeout period to a long MIH timeout period. The latter gives the I/O device more time to complete its operation before the OS indicates it has a potential I/O error condition. But if the OS does not detect any long-running command in its scan of the I/O program, the OS does not extend the primary MIH timeout period, and then the OS declares a potential I/O error condition for the current I/O device operation and invokes a conventional I/O error recovery program, such as retrying that I/O request for a number of times until it runs without error or until a permanent error condition is determined.

7 Claims, 14 Drawing Sheets

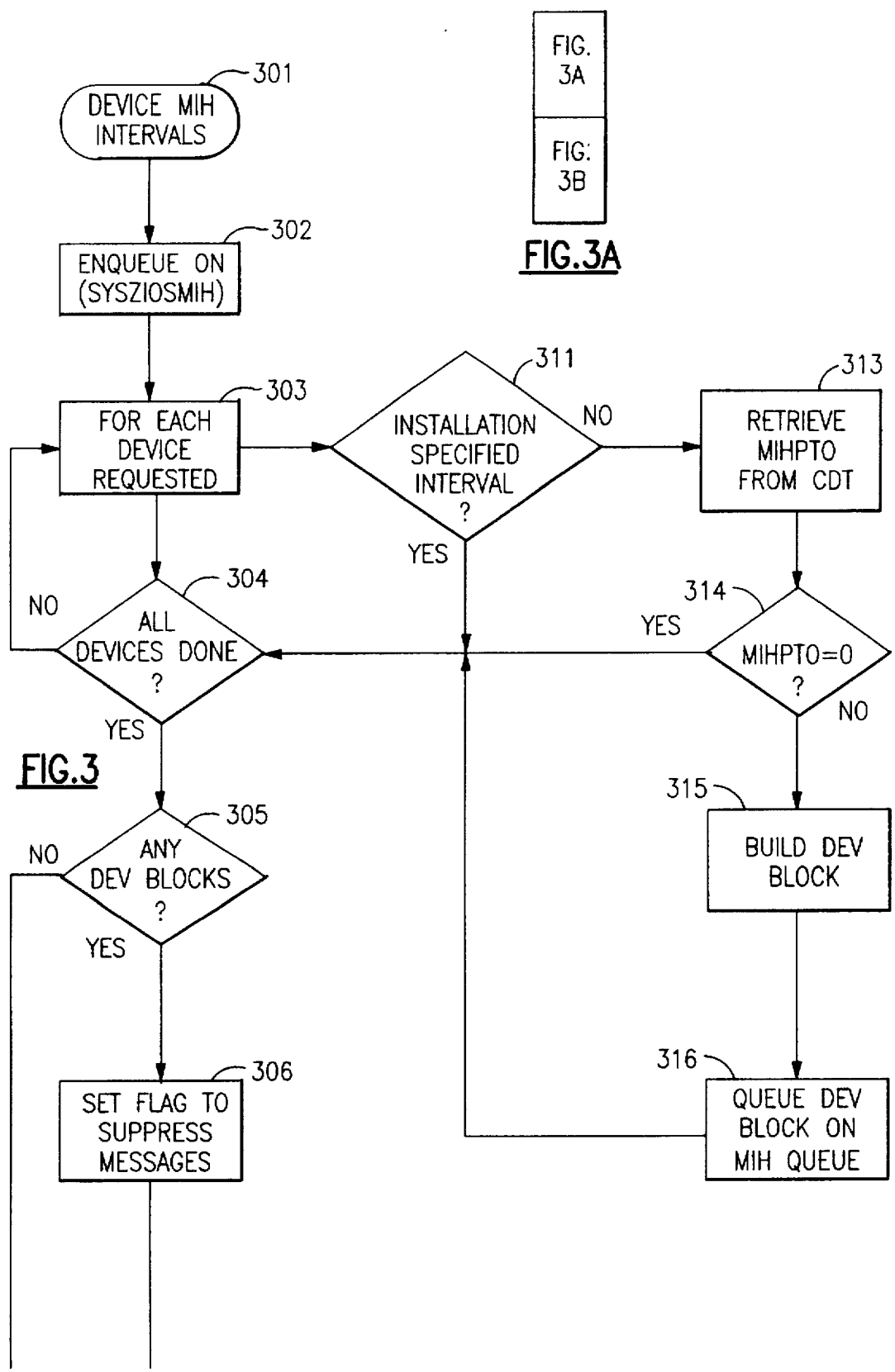

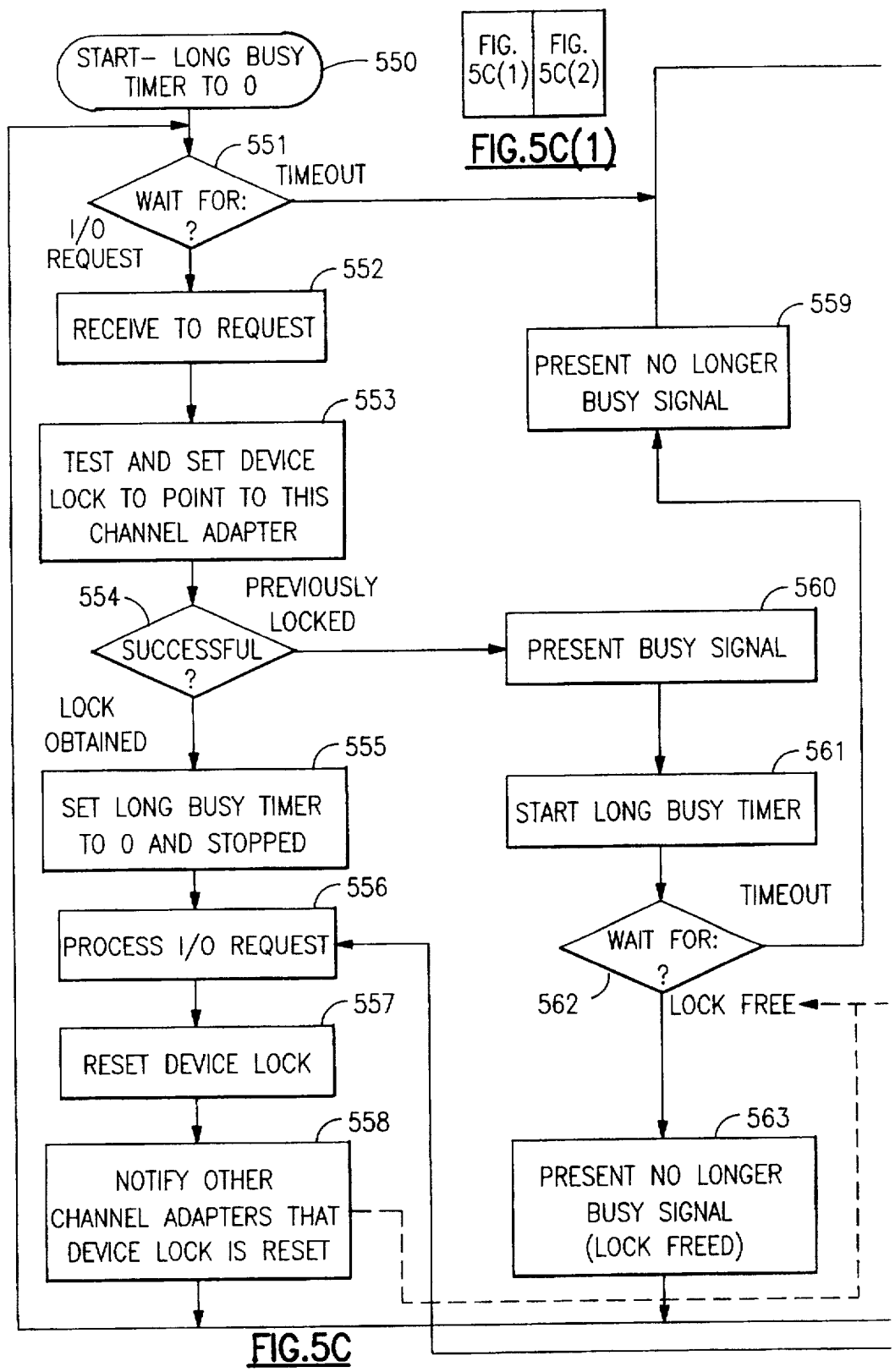

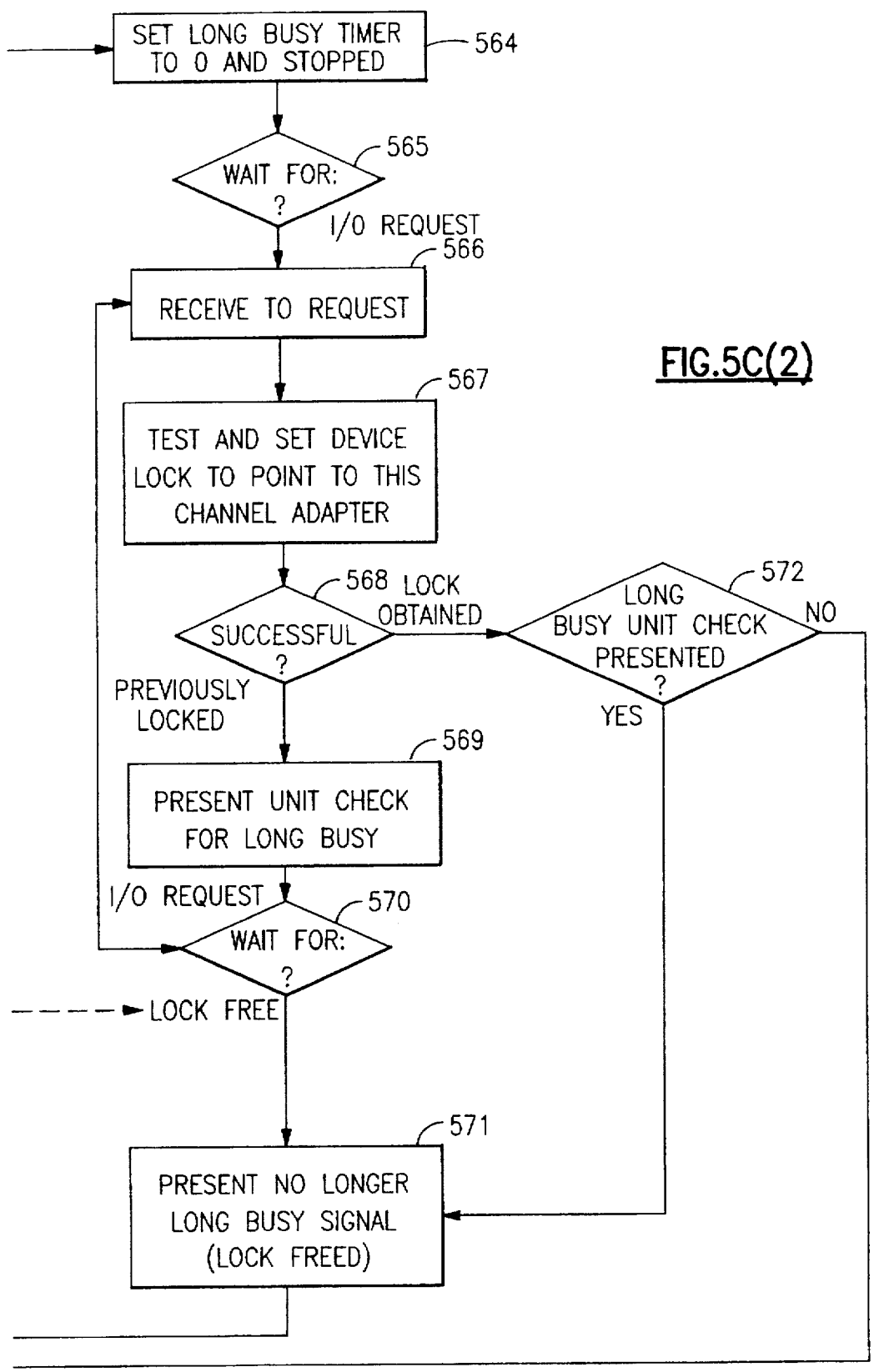
FIG.5C(2)

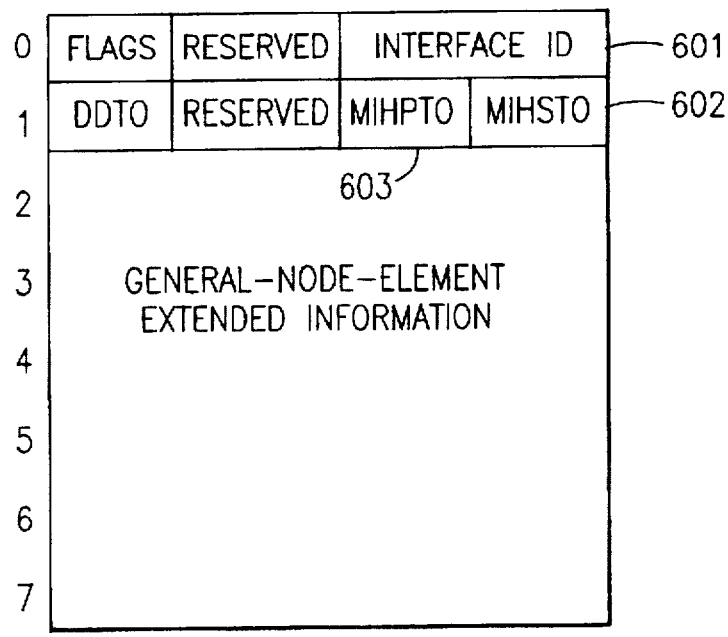
FIG.6A
FIG.6B
| EXPONENT VALUE | VALUE |
|---|---|
| 00 | INCREMENTS OF 1s OF SECONDS |
| 01 | INCREMENTS OF 10s OF SECONDS |
| 10 | INCREMENTS OF 100s OF SECONDS |
| 11 | INCREMENTS OF 1000s OF SECONDS |
FIG.6C

VARIABLE TIMEOUT METHOD IN A MISSING-INTERRUPT-HANDLER FOR I/O REQUESTS ISSUED BY THE SAME OPERATING SYSTEM

FIELD OF THE INVENTION

This invention is related to missing interrupt handler (MIH) timeout controls (generally implemented in software) found in an operating system (OS) for the detection of missing interrupts which are indicative of a potential failure in an I/O device operation. This invention prevents erroneous I/O failure indications which may be caused in an OS when I/O requests issued by the OS are unduly delayed by long commands in I/O programs associated with the I/O requests which may cause a conventional MIH (missing interrupt handler) in the OS to timeout and indicate a potential I/O operation failure when no failure has occurred.

INCORPORATED APPLICATION

The subject specification is related to specification having Ser. No. 08/629,661 filed on Apr. 9, 1996, still pending and specification having Ser. No. 08/629,702 filed on Apr. 9, 1996, still pending. Both entire specifications, Ser. Nos. 08/629,661 and 08/629,702, are incorporated by reference into the subject specification. The applications of specification Ser. Nos. 08/629,661 and 08/629,702 were filed on the same day as the subject application.

BACKGROUND OF THE INVENTION

In all computing environments, interrupts from various I/O devices may go unrecognized by an OS which requested an operation by the device, either because: the I/O device failed to present the interrupt due to a component in the path from the device to the OS failing to properly transfer the interrupt, or the OS failing to recognize the interrupt when presented.

Failure to detect a missing interrupt may cause operations in a data processing system to slow down and ultimately cease when a critical resource cannot be released until the interrupt occurs or the processing associated with the missing interrupt is terminated. Such detection failure may require an unscheduled system restart (IPL) to make the resource available again. Manual attempts to locate the request for the resource on some queue usually take longer than the requesting customer can afford to wait.

To reduce the catastrophic impact of a missing interrupt to the system, a method was developed to detect lost interrupts and allow failed operations to be terminated, recovery mechanisms deployed, and failed operations restarted or to terminate the job that initiated the operation with an error. This mechanism is called the Missing Interrupt Handler (MIH) and has the ability to 'time' I/O operations that are in progress. Actually, this is not a time measurement but rather a limit on the length of time that is considered 'normal' for the longest possible I/O operation to the device. This does not mean that all operations should take a long time but rather, all operations that exceed this time are to be considered abnormal. The Missing Interrupt Handler is therefore a 'safety net' under the system to shield the host from the effects of a lost interrupt.

Initially, only a couple of timer values were established to differentiate between slower devices (unit record) and faster devices (DASD) which allowed only limited ability to tailor timer values for different machines. Two timer values were not adequate and additional individual MIH timer values have been implemented which can be adjusted to meet the needs and response requirements of various devices.

Over time, the capabilities of the MIH component have been expanded to allow dynamic modification of the MIH timeouts, including the ability to place time limits across all I/O request processing including queueing time and error recovery procedure (ERP), instead of just active time as originally implemented. However, today's Missing Interrupt Handler components of computer operating systems have deficiencies.

In today's operating systems there are various default MIH intervals based on device class (i.e. DASD, TAPE, etc. . . .). However, within each device class there is a great disparity between the recommended MIH times for different device types. For example, on tape devices the recommended MIH detection interval for the different model tape devices varies from 3 minutes for S/390 3420 tape device to 20 minutes for a S/390 3490E tape device. This variation in MIH time is due to the varying amounts of capacity a tape can contain and the maximum physical speed that the medium can be moved.

The MIH detection interval must be greater than the time to execute the longest command at the device (e.g. forward space file, rewind/unload, etc. . . .). Another example is for DASD devices. The MVS (Multiple Virtual Storage, IBM's premier operating system for S/390 machines) operating system has a 15 second default MIH time for DASD devices. This usually only needs adjustment by a system operator due to special characteristics of the work load or applications using a particular device. For example, a JES2 (job entry system 2) checkpoint data set may get reserved for long periods of time during initialization, but high availability applications need to be notified after only a few seconds if their I/O has not completed in order for the application to attempt an alternate device and still make transaction time requirements. However, new DASD characteristics further complicate the issue of choosing an MIH detection interval. The IBM 3990 DASD has internal error recovery functions that can take 30 seconds to complete. If an MIH condition is detected during this recovery, the host recovery actions can cause severe problems at the control unit. Thus, it is recommended for the 3990 DASD that system operators set a 30 second MIH interval. Additionally, other devices may be defined to the system as if they are DASD devices. An example of this may be the IBM 3995 optical devices; some operations on these devices require the mechanical removal and mounting of optical media, which can take several minutes. Complicating matters further, any time new devices are added to a computer system, the existing MIH customization information may need to be updated to insure proper operation of such devices.

An additional problem with operating system MIH handlers is that the MIH times are too long. As discussed above, MIH times need to be set by the customer for each device type based on the characteristics of that device. If the longest commands that can be executed are expected to take 20 minutes (i.e. a rewind/unload) then all hang conditions are detected after the 20 minute interval, even though most simple data transfer commands can be expected to execute in seconds. Elongated error detection times impact the customer, in that they degrade system reliability and availability. If a new device with improved technology is substituted for the old device the MIH time must be manually adjusted to meet the new requirements.

Additionally, with today's devices and MIH capability, all commands are timed at the same MIH interval. This applies also to special control and recovery commands that are used by the operating system during recovery and reconfiguration actions (i.e. set path-group-ID, sense path-group-ID, reset allegiance, assign/unassign, control access, etc. . . .). When these commands are issued by the operating system, critical system resources may be held which may delay the execution of other normal customer work. The addition of special timer code for the recovery of these commands is extremely costly to the development of the system and increases the cost of the product.

As described above, computer systems require the customer to manually set the MIH times based on the physical characteristics of the device. For example, the customer is responsible for knowing that S/390 3995 Optical Library device is really defined as an S/390 DASD 3380 device and that the MIH intervals must be set high enough so that MIH conditions are not detected for normal staging/destaging of the optical media. Additionally, if a set of tape drives are added or upgraded, the MIH times need to be adjusted based on the speeds and capacities of the tape drives. This manual process is error prone. If accidentally omitted false MIH conditions are detected, jobs may fail.

Also, MIH specifications need to be synchronized with physical I/O configuration definitions, and updated across system configuration changes done both dynamically as well as by system restart. If the MIH times are not updated correctly, system RAS will be degraded. The fact that customers have to be aware of the MIH detection for different devices adds to the cost of systems management and the overall cost of computing.

System Environment:

FIG. 5a shows a multiplicity of hosts (510). Each host is a general purpose computer system containing one or more central processing units (CPU (511)), responsible for executing programs consisting of central processor instructions, and an I/O channel sub-system (512) responsible for executing channel programs and managing the transfer of information over one or more channel paths (513) between the host (510) and one or more I/O subsystems (520). In the preferred embodiment, host computers are IBM S/370 or IBM S/390 computer systems attached to I/O devices via ESCON or OEMI I/O channel interfaces. However, the computers may be of any type and may in fact be a multiplicity of types. Similarly, the channel paths may be a multiplicity of types, provided the interface is supported by the attaching host and I/O subsystem. The topology of the channel paths is potentially unique to the type of I/O interface.

Each I/O subsystem (520) consists of a control unit (521) responsible for managing one or more devices (530) connected to one or more hosts (510). I/O devices are attached to the control units via one or more device paths (531) that are supported by the devices and the control units for the communication of information. In general, the control unit adapts the I/O interface supported by the device (i.e. device paths (531)) to the I/O interface supported by the host (i.e. channel paths (513)).

Internal to each control unit (521) are facilities which are used to manage the interaction between the multiplicity of hosts and the multiplicity of devices. Each channel path is attached to a channel adapter (524) within the control unit which contains the facilities required to communicate on the associated channel path. A shared memory (522) is present in each I/O subsystem (520) that is accessible by I/O processing elements within the I/O subsystem that control the channel adapters (524). This shared memory contains a block of information associated with each device which is referred to as "device n lock data" (523).

Within each host (510), an OS program is executed by any of its CPUs (511) which performs the operations to cause the channel subsystem (512) to issue I/O signals to a selected device (530) attached to a selected channel path or set of channel paths (513). The OS program is designed such that it monitors the duration of the I/O operation from the time the request is presented to the channel subsystem (512) until a response is received from the channel subsystem (512) indicating that the I/O operation has completed. If the elapsed time of an I/O operation exceeds some threshold, the program detects a missing-interrupt timeout as described in prior U.S. Pat. No. 5,388,254 assigned to the same assignee. This MIH program function is intended to detect I/O operations that have failed to complete due to some unreported condition, thereby avoiding an indefinite suspension of processes that depend on the completion of the I/O operation.

Within the channel subsystem, an I/O request can be queued for a selected device. The I/O request causes a communication to be initiated over a channel path between the channel subsystem and a selected control unit as a result of queuing the I/O request while waiting for a requested device to perform the request. While an I/O request is being processed by the channel subsystem, the OS program is allowed to continue execution of other work. At the completion of the I/O operation, the channel subsystem interrupts the OS program to present the status of the completed I/O operation.

The control unit manages concurrent requests to each device it controls. If the control unit decides to allow an I/O request made by a host, the command is accepted from the channel and is processed for the device selected by the channel. If the control unit decides to not allow an I/O request made by a host because of concurrent activity, the command is rejected with a "busy" indication causing the I/O request to be queued in the channel subsystem. When the control unit determines that it can perform the command after having previously presented it with a busy indication, the control unit presents a "no-longer busy" indication to cause the channel subsystem to reissue the queued I/O request. The requesting OS program is not aware of this interaction except to the extent that its I/O request has not been signalled as having been completed. The algorithm normally used by a control unit to present a busy indication is discussed subsequently. This invention describes enhancements which increase system efficiency by allowing a reduction in the time limit used by the OS program to reliably detect for missing interrupt signals when one or more OSs are making concurrent I/O requests to the same control unit.

Management of Concurrent I/O Requests:

The control unit determines the number of concurrent I/O requests that can be in progress at the control unit for a given device. Often, devices have a requirement that I/O requests be serialized to ensure predictable results on a medium handled by the device. Other design constraints within the control unit may also place limits on the number of requests allowed to concurrently be performed for a device.

FIG. 5b shows a process that can be employed to limit to one the number of concurrent I/O requests accepted, which causes a serialized execution of concurrent requests at the device. This policy is enforced by a device lock protocol used by the channel adapters, in which the adaptor performs an atomic "test and set operation" on a lock associated with the requested device in a lock data block 523 for the device.

This lock test and set protocol is performed before beginning any I/O operation by the device. If the test and set operation is successful (finds the device is available), the I/O operation is accepted and processed by the device. If the test and set operation is unsuccessful (the device is not available), the I/O request of a channel adapter is presented with a busy indication. A channel adapter is successful when it obtained a lock for the needed device (by setting a lock bit associated with the device). At the completion of the device operation, each channel adapter that was signaled a busy indication is then signalled a "no longer busy" indication, so that I/O requests queued in the channel subsystem can again be reissued for the device. This cross channel adapter communication is indicated by the dotted line in FIG. 5b. The implementation of the presentation of the "no longer busy" indication may require consideration of "fairness" mechanisms to prevent certain hosts from continually preventing other hosts from accessing the device. Variations of this method may be provided for different interface architectures (e.g. SCSI untagged and tagged queuing) where a serialization queue is built in the control unit instead of using a channel subsystem queuing capability.

Bounding of Queuing Durations:

A problem that arises with the busy/no longer busy method previously discussed for serialized concurrent I/O requests is that the time required to execute an I/O operation from the host's perspective is NOT a function of time needed for execution of the requested I/O operation at the control unit (CU). That is, the execution time from the host OS perspective is the actual CU/device execution time plus waiting time (during which the CU is executing other intervening I/O operations for other hosts). In effect, without OS knowledge of all I/O operations in the queue for the device, it is not possible to determine the duration of a requested I/O operation for the purpose of determining an appropriate missing-interrupt-timeout value. Given some degree of fairness in the resolution of concurrent accesses and some bound on the number of concurrent requests, a statistical analysis can be performed to pick a duration which will have a high probability of ensuring that the failure to detect the completion of an I/O operation is due to some failure condition and not as a result of concurrent access requests.

For example, assume a given disk device normally executes any command in less than 10 milliseconds. If most I/O requests have no more than 10 commands (10 I/O channel instructions), and there are generally no more than 10 hosts that will get relatively equal service, then multiplying the 10 milliseconds * 10 commands * 10 hosts gives an expectation that an I/O request should take no longer than about 1 second. This number would then be increased by some factor to handle exceptional conditions within some high degree of probability, say to 15 seconds.

The problem is compounded when there is a wide variation in the expected execution durations of the I/O operations for a given device because the statistical analysis for predicting a resolution of concurrent requests must consider the worst case I/O operation execution times, further increasing the discrepancy between the duration of a "short" I/O request and the missing-interrupt timeout.

For example, assume that for a given disk device, a typical command normally executes in less than 100 microseconds, but an outboard copy command (copy the content of this disk to another disk) executes in less than 5 minutes. If we determine statistically that an I/O request will not be queued for longer than eight concurrent requests (i.e. this host gets a turn at least once out of every eight I/O requests processed), then we could estimate that, worst case, the queuing time is 7×5 minutes=35 minutes. If this host is executing a typical command, the missing interrupt timeout estimated as the sum of the queuing time and the command execution time would be 35 minutes and 0.0001 seconds, or alternatively, about 35 minutes. One might also consider the probability of having seven different hosts issue seven concurrent outboard copies and arrive at a conclusion that a smaller timeout limit than 35 minutes is possible, say n minutes where n<35, based on the probability of all the sharing systems initiating a full copy at the same time.

Often, the program must perform additional I/O when a missing interrupt is detected. These I/O requests may be just as likely to encounter a queuing problem and consequently must have the same missing interrupt timeout applied. For the case where the device is in fact broken and is no longer capable of responding to the host, it is easy to see where it could take tens of minutes before the program comes to the conclusion that the job has failed and must be rerun.

In certain environments, the program may not be able to wait for the duration of time prescribed by such statistical methods and still meet its requirements for real time processing. In other cases, the missing interrupt timeout and resulting recovery is of such duration as to create operational difficulties (e.g. processing does not complete within required windows).

Prior MIH detection systems have not worked well for single OS data processing systems in which an MIH process can be the source of error indications when certain scenarios happen. For example, a false indication would occur in a scenario where a long I/O command (a command requiring a long period of I/O operation) was issued to an I/O control unit as the last command of an I/O program, and before the last I/O command is completed, another I/O program is attempted to be initiated by the OS with a short command to the same device. In the prior system, the long command would signal partial completion when the long command is accepted at the control unit. This caused the next request to the I/O device to wait until the device completed operations for the first request. (To those skilled in the prior S/390 I/O architecture, this is known as redriving on primary status, which allows prompt termination of a job and the initiation of a new job following a tape rewind/unload command). If the second I/O request were allowed to start before the first request finished, and the operating system tried to adjust the MIH timeout for the presumed active short command, a false indication would be detected because of the lack of OS knowledge concerning the execution time for the previous long command. This short timeout then would falsely indicate a missing interrupt. No interrupt was actually missing because the short command was not yet started by the device due to the device still performing the prior long command (and neither of these commands could yet provide any completion interrupt).

SUMMARY OF THE INVENTION

This invention is used in a computer arrangement having one or more Operating Systems (OSs), and each OS has a MIH component. The OSs are considered hosts of I/O CUs and I/O devices.

This invention provides novel system processes and features that operate with MIH (missing interrupt handler) software to prevent the MIH software from falsely indicating I/O device operation failure, which may be a problem in systems having I/O requests contain commands which take an exception length of time to complete processing in an I/O device, such as a tape rewind command. The problem occurs when the MIH component must wait a long time for a current I/O request to complete because a channel program of the I/O request contains a "long command" which causes a predetermined MIH timeout to be exceeded that results in a potential failure indication for the requested I/O device—when in fact that device has not failed but merely is still processing the same request for the OS. The MIH detection software starts an MIH timeout when its OS issues the I/O request, and indicates a potential failure of that I/O device operation if a successful-completion interrupt is not received from that I/O device before the expiration of the MIH timeout to declare that interrupt to be missing.

The subject invention provides a variable MIH timeout period for each delayed I/O request—as opposed to the fixed length MIH timeout periods previously used, wherein if the end of the MIH timeout period is reached without the requested I/O device providing a successful-completion interrupt signal to the requesting OS, an MIH timeout occurs which triggers a potential I/O device failure indication in the OS.

The invention varies the MIH timeout period in predetermined increments controlled by a novel process. A primary timeout period is started in the MIH component when an I/O request is issued by the associated OS. The primary timeout is kept as short as possible, but it must be longer than the completion time required by most I/O requests having channel programs containing only short commands. A long command is herein defined as a command having a device execution time which exceeds the primary timeout period. (Previously, the MIH timeout had to accommodate all I/O requests whether or not the request had any long command, and as a result the previous MIH timeout periods had to be very long.)

It is therefore an object of this invention to provide a primary timeout period which is much shorter than the prior MIH timeout period and which can be used for most I/O requests. This invention provides a long extension to the short primary MIH timeout to accommodate the few cases where a long command is found with an I/O request. The result is that a significant reduction is obtained in the average MIH timeout period of a computer system by using this invention, to obtain an overall increase in system performance.

With the subject invention, a timeout of the primary MIH timeout period causes the associated OS to scan the channel program of the request to determine if the channel program contains any long command. If any long command is found, the MIH timeout period is extended by a long-busy timeout period which may be longer than the primary MIH timeout period. If no device-completion interrupt is received before the long-busy timeout occurs (a missing interrupt indication), such timeout indicates a potential I/O device operation failure as the cause of the lack of receiving the interrupt, and it triggers a call to an I/O recovery program (which may be conventional and may repeat the I/O request by a predetermined number of times and test for various condition in the system before verifying the existence of an actual I/O error condition.

Thus, the first MIH timeout period for a variable timeout supporting an OS-issued I/O request is herein called the "primary MIH timeout period", and the second MIH timeout period for the variable timeout is herein called the secondary MIH timeout period.

However, if no long command is found in the associated channel program, the MIH timeout period is not extended, and a potential I/O error condition is indicated by the MIH component to the OS, which then immediately starts the I/O recovery program to verify if an actual I/O error condition exists.

This invention does not use any signalling from the I/O CU to control when to extend the MIH timeout period. However this invention may be used in conjunction with the CU long-busy interrupt signal claimed in PO9-96-028 (provided to the requesting OS by a threshold timeout in an I/O control unit (CU) for signalling that the I/O request is being delayed in the CU beyond the primary MIH timeout period). The CU threshold signal provides backup to the subject invention to also initiate the OS to provide an MIH timeout extension to the short primary MIH timeout period if the subject invention should fail to operate correctly. The timeout of a threshold timeout period occurs in the CU near, but before, the end of the current MIH timeout period to allow the primary period to be extended before it timesout and causes an indication of a potential I/O device operation failure.

The invention claimed herein may be used in an environment of multiple OSs sharing an I/O device(s). That is, this invention applies to situations where the same OS has issued both the current and delayed requests for the same device. Each of plural OSs can only operate with its own I/O requests, since each OS does not know of requests being issued by other OSs in the computer arrangement. Thus a requesting OS is not aware of current processing being performed for another OS's I/O request by the same device, and the OS is oblivious to any I/O request queuing for other OS's requests in the channel subsystem or within the control unit. Furthermore, the channel subsystem is unaware of the amount of I/O request queuing that is occurring within the OSs.

A way to resolve the multiple-OS dilemma is to use CU long-busy signalling with, or without, the non-CU controls of the subject invention in a computer arrangement having plural OSs sharing I/O devices. Accordingly, the subject invention is best used in a computer arrangement having only one OS.

The CU threshold timeout for an I/O request is generated and signalled by the CU to the requesting OS by means of a long-busy I/O interrupt signal, which indicates to the OS the CU's threshold-timeout reason for an I/O delay. In response to the long-busy interrupt, the OS extends the MIH timeout period by a timeout extension increment. In systems not having a long-busy interrupt, it may be simulated by using another type of interrupt, such as an error indicating interrupt, with status information indicating it represents a long-busy condition and not an error condition.

Accordingly, this invention may be used in systems having only a single OS where any of its I/O requests may cause a very long wait to a later issued I/O request for the same device, such as when the request using the device contains a long command which would cause the MIH timeout to occur before the end of the long command, such as for example when the request contains a tape rewind command or tape mount command. In this case, the OS's knowledge that it has issued an earlier uncompleted request containing a long command causes it to extend its MIH timeout period without any CU long-busy interrupt.

The time length of an MIH timeout extension period may be indicated by a respective MIH extension timeout value stored with the OS.

The preferred embodiment supports a CU which has a plurality of channel interface adapters in which each adapter independently manages one delayed I/O request at a time received on a I/O channel path connected to that adapter requesting a particular I/O device which is currently not available. All adapters in the CU may be currently busy with different devices simultaneously performing different I/O requests.

In this invention the OS MIH timeout period is extended only if the request has not completed at the end of the primary MIH timeout period, and the MIH timeout period then continues to run with the expectation that the requested I/O device will successfully complete its current operation before the end of the secondary MIH extension period, which timeout would declare the I/O operation to have potentially failed. Hence, with this invention, the MIH timeout period may be extended by none or one additional extension increment, as needed, to avoid a false device failure indication in the OS.

Accordingly, the invention is not concerned with whether or not the CU uses a protocol in which the CU ends its responsibility for the handling a delayed request after one threshold is reached (at the end of the primary MIH timeout period), since it does not use signalling from the CU for controlling its MIH timeout extension.

Theoretically, this invention allows use of a variable MIH timeout period having any finite number of MIH timeout extensions, in which the OS uses another extension after expiration of each current extension increment until a last extension is exceeded which causes the MIH timeout triggering the potentially I/O operation failure indication. Hence there will be a predetermined number of extensions.

A long command, with no following chained command, is sometimes referred to as an "asynchronous immediate command". Its busy state remains for a very long time at the requested device, or at its control unit until the requested device completes the requested operation.

If we consider a device which uses commands with similar command execution times (i.e. no command which has a significantly different command execution time), an ideal situation would be to report any queuing that is going to exceed the worst case execution time of any appropriate I/O request. In this case, the MIH timeout would be set to slightly larger than the worst case expected execution time from the prospectus of the OS. If the OS did not receive an indication that an I/O operation has completed or that excessive queuing is occurring, then it would assume that an interrupt has been lost.

A practical MIH timeout is on the order of several times the worst case time for executing a typical command.

The Long Busy Protocol may be used for handling long executing commands in I/O requests. There are non-error conditions, such as excessive queuing durations, which can result in significantly long processing times from the prospective of the requesting OS (even though the command is not yet executing in the requested device), and this invention can be used to handle I/O commands of any duration from the OS perspective. More specifically, this invention notifies the requesting OS when excessive queuing exists for a request, so that the OS can adjust its MIH timeout to an expected duration of the I/O request being issued plus a time threshold based on what the I/O subsystem reports as excessive queuing. Given that excessive queuing is infrequent, the overhead of reporting an excessive queuing condition has little overall impact on system efficiency. As such, the invention allows the OS to use a relatively short MIH timeout for normal short command processing, while still allowing longer MIH timeouts to be used for long duration command processes that may occur.

It is therefore an object of the present invention to provide an OS internal process to determine when it should extend its MIH timeout period for an I/O request by scanning an I/O program currently executing on the device to determine if a request is being excessively delayed by a long running I/O command being performed by the device.

It is a further object of the present invention to provide granular MIH timeout extensions for handling missing interrupts.

It is a still further object of this invention to eliminate previously required manual customization of MIH timeout values in an OS when I/O configurations are modified by adding new devices, renaming devices, moving devices, or applying a new service to existing devices.

In a preferred embodiment of this invention, each I/O command for device operations is classified into one of two classes, short and long, according to the expected execution time of the command—including any internal recovery processing time and queuing time caused by busy conditions for the command. Short commands normally execute in milliseconds, such as a disk seek command. Long commands may take many seconds/minutes to execute, such as a tape rewind command.

Two MIH timeouts are assigned in relation to the execution of I/O requests (i.e. in channel programs): a PRIMARY MIH timeout and a SECONDARY MIH timeout. Each timeout starts when an I/O request is issued to the channel subsystem by an OS, such as when a processor executes a "start I/O", or a "start subchannel" instruction. Each I/O request containing only short duration commands is expected to execute during an assigned PRIMARY MIH timeout period, and each I/O request having at least one long duration command is expected to execute during an assigned SECONDARY MIH timeout period. These MIH timeout periods may be defined for each I/O device type, and hence they may differ from one device type to the next.

Thus the PRIMARY MIH timeout period ends after completion of the longest expected execution time for most I/O requests, and this MIH timeout period includes any internal recovery processing time and queueing time caused by busy conditions for any of such commands. The SECONDARY MIH TIME interval (period) ends after completion of the execution time for an I/O request containing one or more long commands. A long command has a device execution time which is longer than the PRIMARY MIH timeout period but is shorter than the SECONDARY MIH timeout period.

Thus, each I/O command (defined in any I/O computer architecture for its usable device types) may be classified by this invention as either a "short duration I/O command" which completes within the bounds of an assigned primary MIH timeout, or as a "long duration I/O command" which completes after expiration of the primary MIH timeout but before expiration of the secondary MIH timeout, when both of these timeouts are started when the OS issues the start instruction for the I/O request having the commands.

The preferred embodiment herein uses the S/390 architecture in which I/O commands are defined by channel command words (CCWs) interpreted by an I/O processor in an I/O subsystem of a central processor complex having one or more CPUs, and any CPU may initiate I/O requests.

Each I/O device has a "self description data block" stored in a control unit to which the device is connected. Each device's self description data block is modified by this invention to include both a primary MIH value and a secondary MIH value for the associated device. Also, the self description data block contains two lists of commands, one list for short duration commands and a second list for long duration commands. Any device's self description data block may be optionally obtained by a CPU executing a "read configuration data" CCW, for example, to obtain the command lists or the two MIH intervals.

When an OS initializes its on-line devices (devices to which the OS can send I/O requests), validation operations are performed to determine that the devices indeed exist and are defined correctly to the OS. Part of this initialization process obtains the self description data block for each device and builds a software table that represents the physical I/O configuration available to the OS. The device's self description data may optionally include a primary MIH time value and a secondary MIH time value. If the device's self description data block contains a primary MIH time for which the customer did not explicitly specify an overriding MIH time interval, a default primary MIH value is assigned therein for the device. Similar configuration processing is performed for any I/O device that is varied on-line after system initialization.

Each I/O request has an associated channel program comprised of CCWs. The channel program should complete execution within the primary MIH time interval if it does not contain any long commands. If the channel program contains any long command(s), it should complete within the secondary MIH interval. After an I/O request has been active for the duration of one primary MIH time value, the OS invokes a device dependent MIH exit to perform a subprocess that scans the channel program to determine if the channel program contains any long running command (represented in the associated long command list for the device).

If the channel program does not contain any long executing commands, the primary MIH interval is used for the I/O request. If the channel program contains at least one long executing command, the secondary MIH timeout extension is used for the I/O request.

The MIH timing process is started when the I/O request is issued by the OS. This process increments a counter to measure the total time that has elapsed for the I/O request since the OS made the request to its CEC's I/O subsystem. The timing process periodically compares (e.g. at a specified timer interrupt signal) its currently measured elapsed time against a chosen MIH timeout value (primary or secondary MIH timeout period) to detect for expiration of the chosen MIH timeout period. Once a timeout has been detected, the interval timing process requests that the OS terminate the channel program of the I/O request, and to invoke normal recovery processes.

But with this invention, no false error condition is detected at the end of the primary MIH timeout period when a "long-busy" command has been detected by the OS. The "long-busy" signal indicates that the request is being held up by proper operation of the device, and that no I/O interrupt is in fact missing. Hence, the request will wait for the current I/O request to complete. The waiting I/O request remains queued for the device until a no-longer busy status is seen for the device indicating that another I/O request can now execute. If the I/O request stays queued for longer than the secondary MIH time period, the timing control process may start the MIH interval over, such as by simulating an interrupt to end the current MIH timeout measurement for the I/O request and signal a retry for the I/O request that will start the timeout measurement from its beginning for retrying the I/O request. The retries may be under count control from device error recovery procedures in the system.

Thus, the device may be put into a proper state (busy or long-busy) when it starts executing a channel program for an I/O request, and that state may last until the request completes. The busy/long-busy state at a device ends when the associated I/O request successfully completes.

The primary and secondary MIH intervals are used by the requesting OS which has its I/O request executed by the device. The long-busy signals allow adjustments (not previously used) in the MIH interval having I/O requests waiting for the device.

It is hence an object of this invention to operate a system under a single OS which allows overlap of a next request with a current request which has not yet completed, and still prevent false MIH error indications of missing interrupt signals, such as would occur in some scenarios. This invention solves the overlap and false indication problem by immediately allowing a MIH timeout period extension when a long command is accepted by an I/O control unit, even though the command had not in fact completed operation in the associated device (and it may not have even started device operation when it is determined by the requesting OS.

Further, in a I/O control unit (CU) capable of executing long commands, the CU may send an "immediate" (long-busy) interrupt signal to the central processor complex in response to CU acceptance of a "long command". "Immediate" means that the "completion interrupt" is effectively sent to the central processor complex at the time the command is accepted at the control unit, although the device need not have then started executing the command; and that no device-end interrupt signal is provided later when the device actually completes its processing for the command. The "long busy" state continues at the CU until all operations for the long command are completed by the required device. This invention allows the I/O request to remain at the CU when no long busy interrupt is generated by the CU to end the I/O subsystem responsibility for handling the delayed I/O request. Then the sole responsibility for the delayed request is with the OS, which continues its long-busy MIH period extension, so that the MIH process then continues its timeout period for detecting an MIH error condition.

The long busy state of the device may at any time be tested by the OS issuing a test instruction to the CU, such as to determine whether the OS wants to delay issuing another request to that device if a long busy state exists for the device. Thus, the inventive combination of a "long busy" signal for a device, and an "immediate" interrupt signal to the OS prevents false MIH indications from occurring for long busy commands, as happened in prior MIH systems which waited for actual device operation completion before sending a completion interrupt to the OS. Thus at any time the long busy state in the control unit may be tested by any executing OS to determine the availability of the associated device before issuing another I/O request for operating that device.

BRIEF DESCRIPTION OF THE DRAWINGS

FIGS. 5a, 5b, 5c and 5d are flow charts showing control flow for control units and their devices supporting LONG-BUSY conditions.

FIGS. 6a, b and c are flow diagrams describing how an operating system obtains a device's self description data, which includes its PRIMARY MIH TIMEOUT interval and its SECONDARY MIH TIMEOUT interval.

DESCRIPTION OF THE PREFERRED EMBODIMENT

Figure 1:
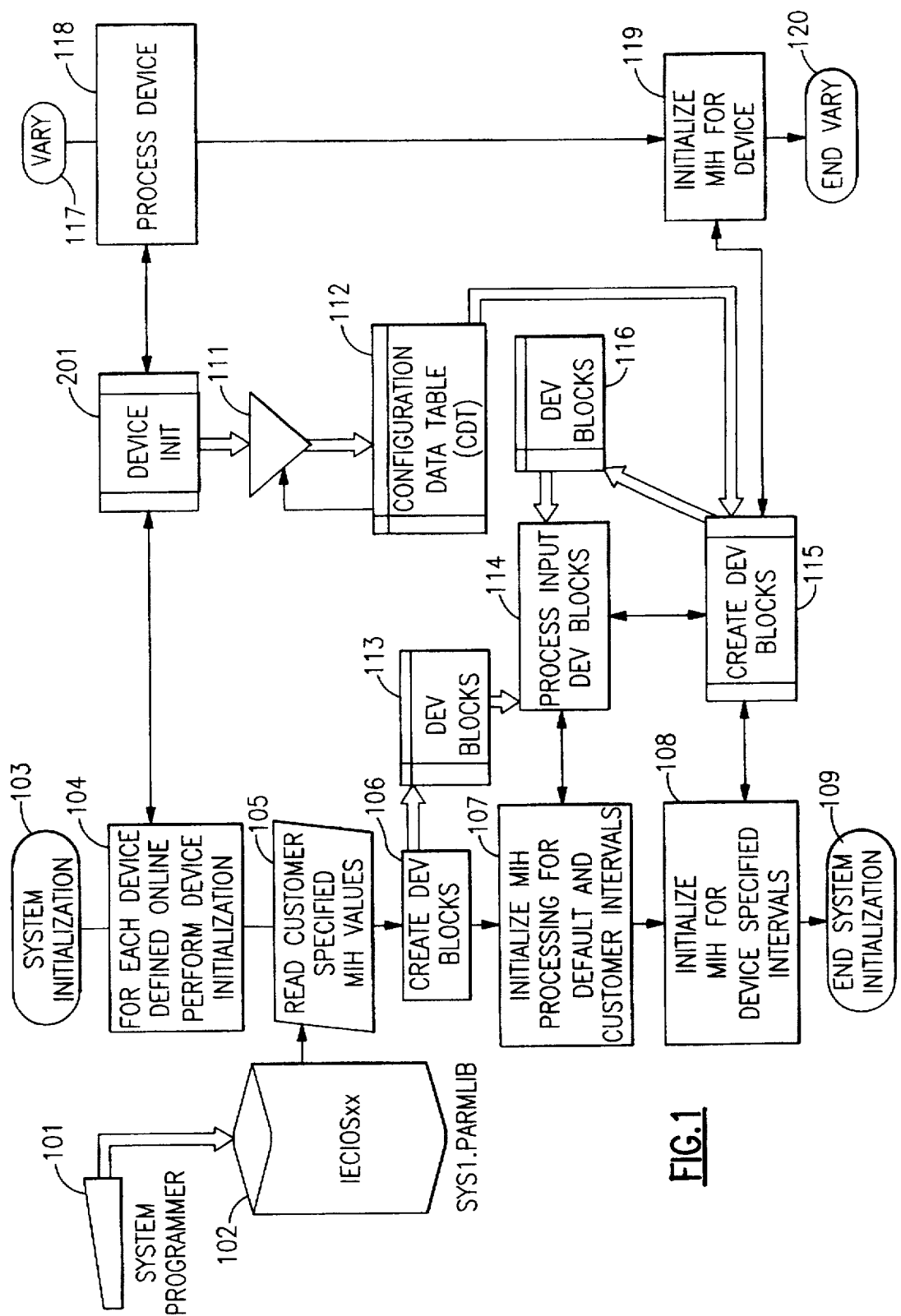
FIG. 1 is a flow chart showing a control flow for system initialization and for a VARY-command device processing, which establishes the initial missing interrupt time intervals for each device.

The environment for this preferred embodiment is described as including IBM's MVS/ESA (Enterprise System Architecture) and the IBM 3590 tape storage device. Those skilled in the art will understand that the methods described herein for this preferred embodiment may be applied to other operating systems and computer architectural platforms without deviating from the scope of the claimed invention.

Device Self Description Extensions:

Devices supporting the preferred embodiment will return two new fields contained in the self description data when using the Read-Configuration-Data command, previously described herein, in the following manner:

Missing Interrupt Handler Primary Time Out (MIHPTO):

Byte 2 of word 1 (603) contains a value which specifies the control unit's recommended "primary MIH time-out interval" which is used to set the missing-interrupt-handler timeout for the device. This timeout is the longest time a channel program is expected to last, taking into account any device recovery processes, and any queuing time, as a result of a presentation of a busy or a channel command retry status if no value is specified for the missing-interrupt-handler secondary timeout. If a secondary MIH timeout is specified, then this time is the longest time a channel program (which contains no model-dependent long-running commands) is expected to take, taking into account any device recovery processing, and any queuing time, as the result of busy or channel command retry status.

The primary MIH time-out interval value is a base-ten value obtained from the mantissa and exponent specified in the primary MIH time-out interval field. A primary MIH time-out field containing this value has the format shown in FIG. 6b (604).

When the mantissa is greater than zero, bits 0–1 of byte 2 of word 1 (EX) contain an unsigned binary integer that is the exponent for primary MIH time-out values greater than zero. When the mantissa is zero, no value is specified for the primary MIH time-out value, and bits 0–1 of byte 2 of word 1 (EX) have no meaning.

Bits 2–7 of byte 2 of word 1 contain an unsigned binary integer that is the mantissa for the primary MIH time-out value. When this field contains a zero, no value is specified for the primary MIH time-out interval.

The exponent field is decoded as shown in FIG. 6c.

Secondary MIH Time Out (MIHSTO):

Byte 3 of word 1 (602) contains a value which specifies the control-unit's recommended value for the program's secondary MIH time-out interval for the device. The MIHSTO value is the larger of:

The maximum expected duration of any long-implicit allegiance formed for device dependent long-running commands, or The maximum expected duration of a device-dependent long-busy condition.

The MIHSTO value is the maximum expected duration of long-busy conditions or the longest expected execution time for channel programs containing a model-dependent long-running command, taking into account any device recovery mechanisms and any queueing time as a result of busy or channel-command-retry status.

The secondary MIH time-out value is a base-ten value based on the mantissa and exponent specified in a secondary MIH time-out field.

The secondary MIH time-out field has the format shown in FIG. 6b.

When the mantissa is greater than zero, bits 0–1 of byte 3 of word 1 (EX) contain an unsigned binary integer that is the exponent for secondary MIH time-out values greater than zero. When the mantissa is zero, no value is specified for the secondary MIH time-out interval, and bits 0–1 of byte 2 of word 1 (EX) have no meaning.

Bits 2–7 of byte 3 of word 1 (Mantissa) contain an unsigned binary integer that is the mantissa for the secondary MIH time-out value. When this field contains a zero, no value is specified for the secondary MIH time-out value.

The exponent field is decoded as shown in FIG. 6c.

Figure 5A:
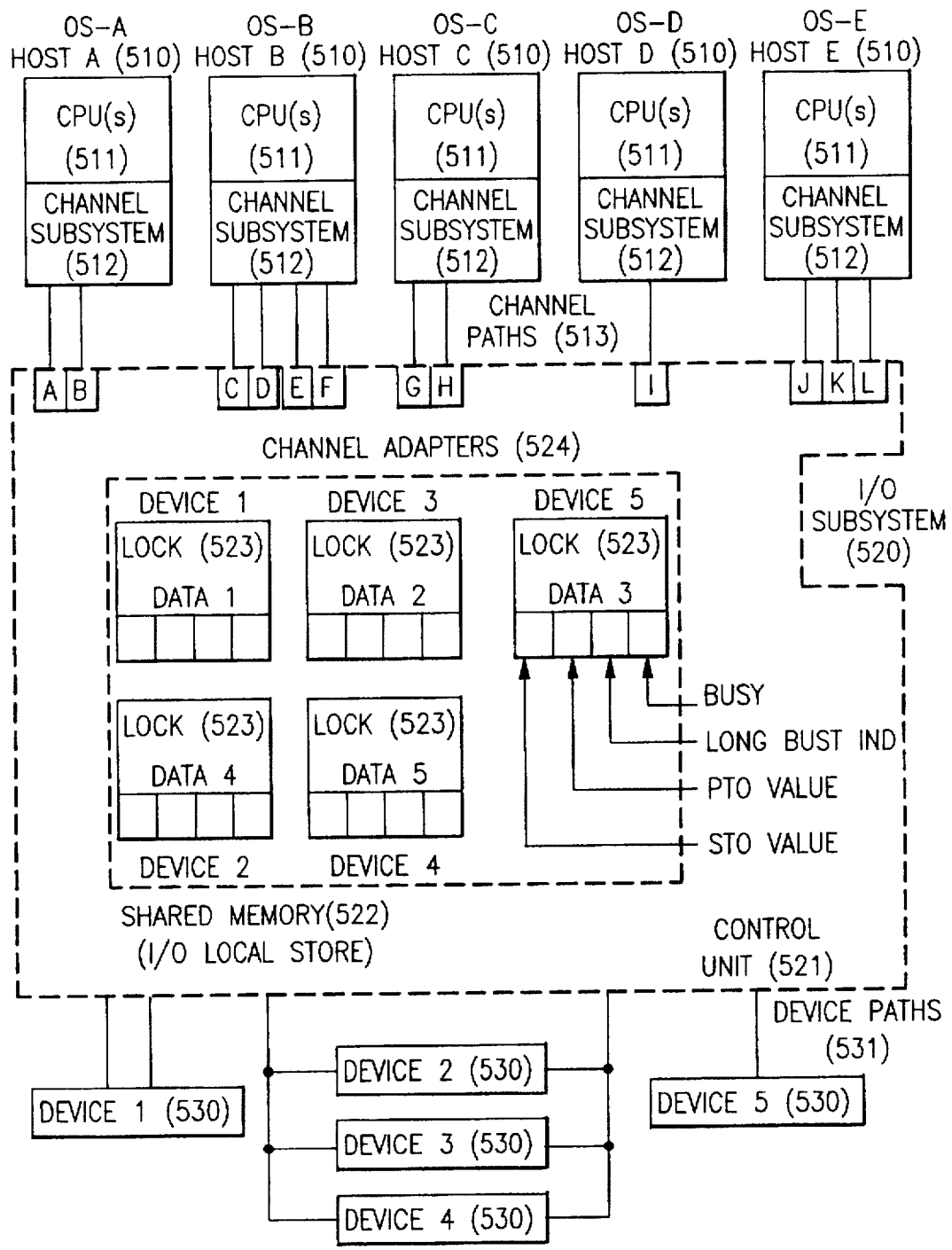
Figure 5B:
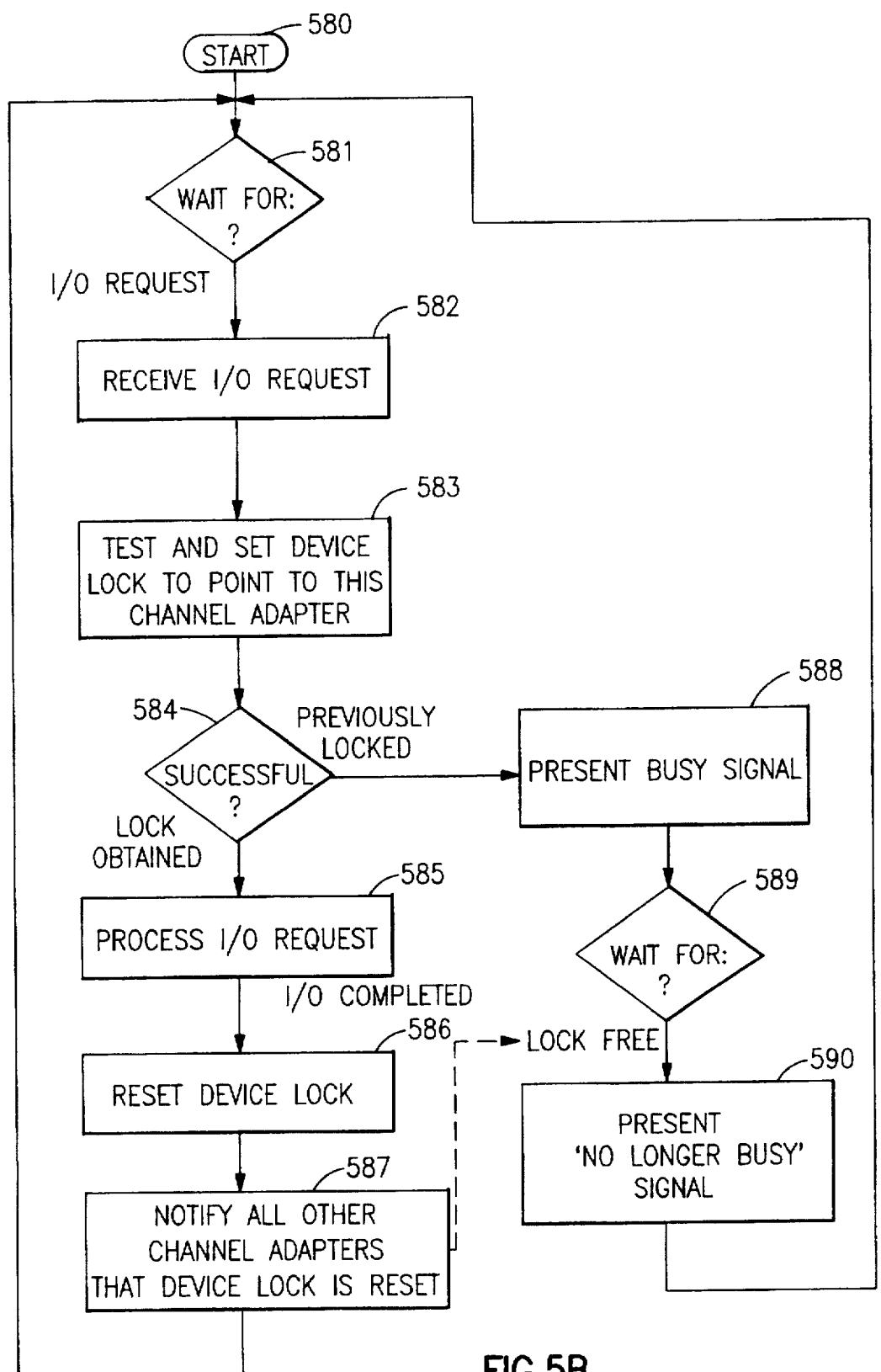

Long Busy Protocol:

The process described herein in the section "Bounding of Queuing Durations" as follows:

The method employed here is shown in FIG. 5c and is a modification of the method shown in FIG. 5b. The method uses a CU timer for each channel adapter built into the CU. Each CU timer measures the queuing time of an I/O request received by a respective channel adapter from the time the I/O request is first received by the channel adapter until the requested device begins processing of the request. The CU timer is initially set to zero and, once started, begins to measure elapsed time. A CU timeout is detected by the control unit if the control unit timer's elapsed time exceeds a "threshold" value defined as somewhat less than the MIH time-out value currently being used by OS software monitoring the I/O request. The concept here is that the control unit is timing in order to be able to transition from an active to a long busy (LB) state.

Each channel adapter performs an atomic "test and set" operation on a lock associated with the requested device before the device is allowed to begin the I/O operation for the request. If the test and set operation is successful (i.e. the request obtains the device's lock), the I/O request is accepted and processed by the device; this may involve one or more I/O commands to the device. If the test and set operation is unsuccessful, the I/O request is presented a busy indication and the CU timer is started.

The CU timer is reset when the requesting channel adapter successfully obtains the lock for the requested device, since acceptance of the I/O request is an indication of the end of the request's queueing time. At the completion of the I/O request by the device, the other channel adapters are signaled that the lock has been reset and the device is again available. For other channel adapters which have been presented a busy indication and have not experienced a timeout, the signal causes a "no longer busy" indication to be signaled which in turn causes the channel subsystem to again reissue the I/O request to each of these channel adapters. The CU timer continues to run for each channel adapter, since the reissuance of the I/O request may again fail to get the device lock, resulting in another busy indication and a continuation of the queuing time.

Should a CU adapter timeout occur, the channel adapter is conditioned to signal a unit check indication to the channel when an I/O request is next received. In the case where the timeout occurs between the presentation of a "busy" indication and a "no longer busy" indication, a "no longer busy" indication is signaled to the channel subsystem in order to get it to reissue the I/O request that is queued within the channel subsystem. The "unit check" indication is presented to the software and is accompanied by "sense" data that informs the OS software that the control unit is still functional, but that the device is in the "long busy state" (i.e. it is not responding to this I/O request because it is busy processing operations from other hosts that have exceeded the maximum queuing time on this I/O request). The normal OS software response to this indication is to wait for a "no longer long busy" indication which is presented by the channel path the next time the device lock is freed.

There are some complexities of implementation that warrant a discussion. Multipathing systems as described in the subsection "System Environment" tend to retry I/O requests over the available set of channel paths when a busy indication is received (at least in certain modes of operation where the set of channel paths associated with a given host are not coordinated as a group). As such, more than one channel adapter may end up signaling a busy indication and be primed to present a no longer busy indication. When the resulting no longer busy indications are presented, the channel subsystem will choose one of the available paths to redrive the I/O request on. There are also cases where the I/O may be terminated in the channel subsystem and not reissued at all.

Software Timeout Values:

As previously described, this invention provides that a given I/O request that remains queued due to a received busy indication for the duration of the long busy timeout will be redriven and subsequently be presented a "unit check" indication that is visible to the software. The software in turn can expect that a given I/O request will either complete within the time period given by the execution time of the I/O request plus the long busy timeout or a long busy indication will be received.

Figure 5D:
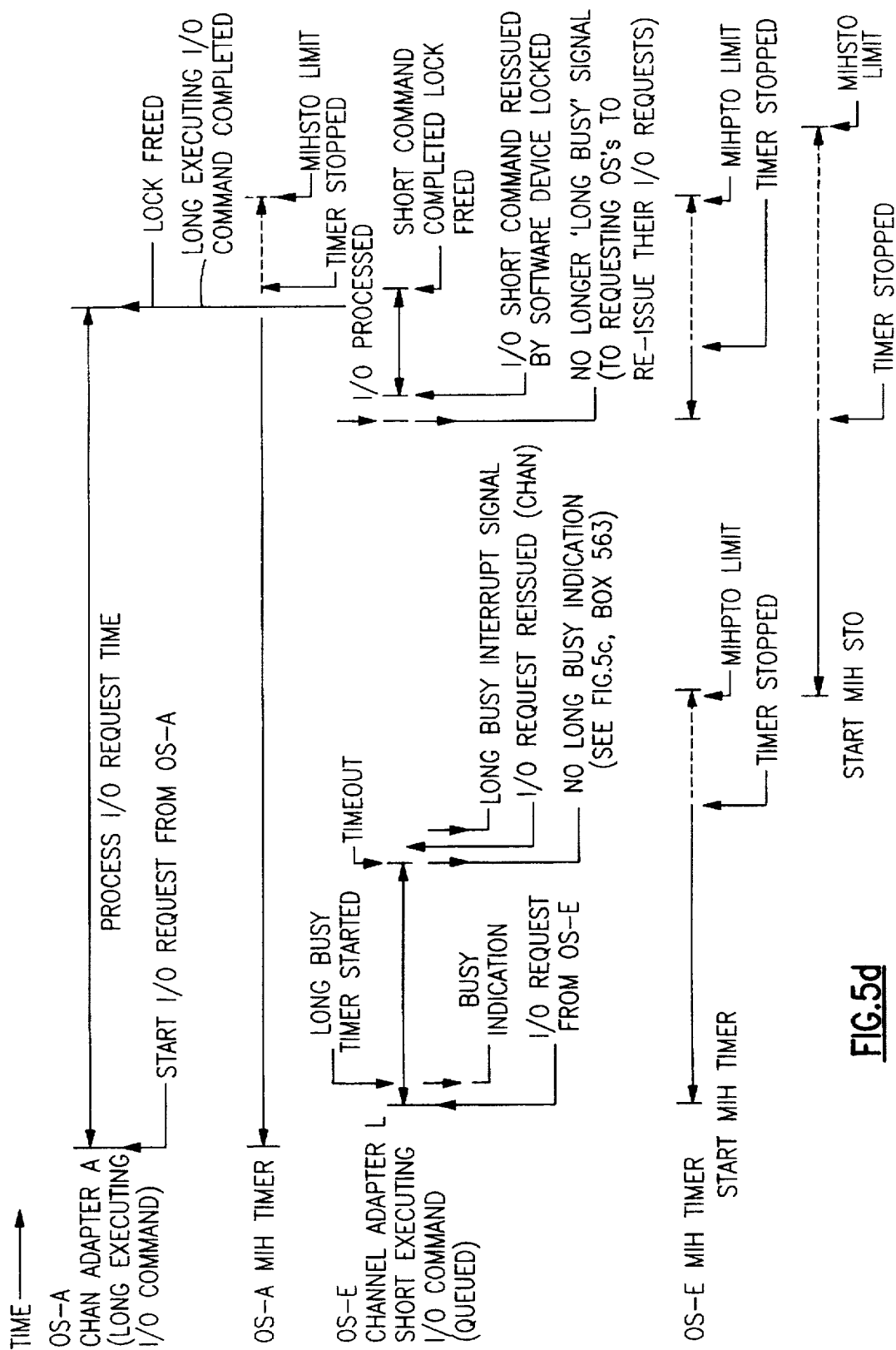

Additionally, since the "no longer long busy" indication is signaled when a device's long busy timeout has not reached its time limit and is thereby freed, the time period between receiving a "long busy" indication and a "no longer long busy" indication is bounded by the worst case execution time of any given I/O request. As determined for a given device, this timeout value can be used to ensure that the "no longer long busy" indications are not lost. The relationship between a channel path that has queued an I/O request and a channel path that is executing a long command is shown in FIG. 5d.

In order to factor in the effect of command execution times on the MIH timeouts, commands comprising the channel program for an I/O request can be divided into two classes, long and short. (Theoretically, the command classification may be done by providing more than two classes of execution times, e.g. short, intermediate and long, etc.; however, two classes are used in the preferred embodiment.) OS software analyzes the commands for a current I/O request to determine whether its channel program contains, or does not contain, a long command, and then uses the short MIH timeout value if no long executing command is found for the I/O request, which is the primary MIH timeout (MIHPTO) value. The long MIH timeout value is used if one or more long commands are found in the channel program for the I/O request, which is the secondary MIH timeout (MIHSTO).

Thus I/O requests may be classified as either short requests (I/O requests having a channel program not containing any long executing commands), and long requests (I/O requests having a channel program containing at least one long executing commands.

The primary MIH timeout (MIHPTO) value may be determined as the execution time expected for a nominal I/O request that DOES NOT contain long commands. The secondary MIH timeout (MIHSTO) value may be determined as the sum of the execution time for the longest command and the worst case execution time for a nominal channel program of an I/O request that DOES contain long commands.

The OS software detects a missing interrupt for a short I/O request if the MIHPTO elapses before receiving an interrupt indicating either: 1) a completion indication for the short I/O request, or 2) a long busy indication for the needed device representing that the device has become busy executing a long command for another request. If a long busy indication is received, the OS software queues the I/O request and awaits the reception of an interrupt from the device signalling a "no longer long busy" indication, after which the OS software can reissue the I/O request to that device.

For a long I/O request, the OS software detects a missing interrupt from the device if the MIHSTO elapses before any interrupt is received indicating the completion of that long I/O request.

After the reception of a long busy indication by the OS software, it detects a missing interrupt if the MIHSTO elapses before receiving any "no longer long busy" indication.

Figure 2:
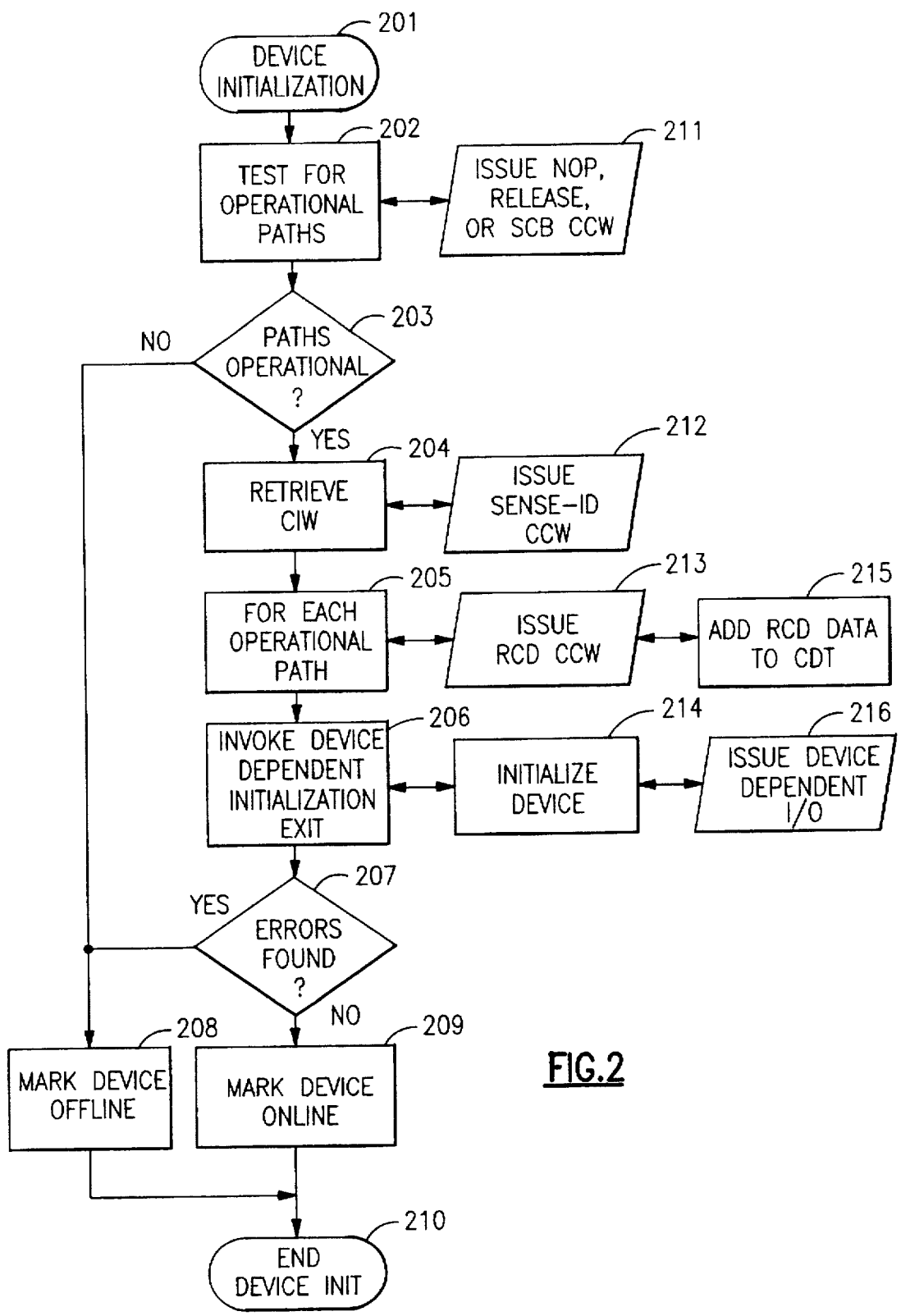
FIG. 2 is a flow chart showing a control flow for device validation and initialization which includes retrieval of the device dependent MIH time intervals.

System Device Initialization:

Step 104 in FIG. 1 represents a device initialization process, which is shown in detail in FIG. 2, which performs the system initialization process for each device being defined to be online to the operating system. The device initialization process is invoked at step 201 in FIG. 2 and ensures that the device (shown in FIG. 1) is operational (202) by testing each available path to the device with an innocuous I/O command in step 211. In the case of tape drives, a no-operation (NOP) channel command is issued. If no operational path is found in step 203, the device is marked offline (208) and processing continues to the next device (104). If at least one operational path is found for the device (204), a sense-id I/O command is issued (212) in order to retrieve command information words for the device (in the current ESA/390 computer architecture). The command information word identifies the channel command that allows the program to retrieve the device self description data. For each operational path to the device (205) the read-configuration-data command is issued (213) to retrieve the device configuration data record (CDR) and add it to the OS configuration data table (CDT) in step 215.

FIG. 6a shows the device PRIMARY MIH TIMEOUT value (603) and the device SECONDARY MIH TIMEOUT value (602) contained in the CDR.

In FIG. 2, once the device self description data has been placed into the CDT in the OS, device dependent initialization procedures are invoked at step 206 to initialize system control blocks with information on how the device can and will be used. If no errors are found during the device initialization process by test step 207 the device is marked online and available for use by step 209. If errors are found by step 207, the device initialization process then marks the device offline in step 208, and the device cannot be used by applications until the error is fixed.

In FIG. 1, once all the devices have been validated and device initialization process completed at step 104, MIH initialization commences at step 105. MIH initialization first consists of reading customization data specified by the system programmer in a SYS1.PARMLIB dataset, member IECIOSxx (102). This customization data consists of the MIH timeout values that the customer wants imposed on certain I/O devices. This customization data is optional, as there are fixed MIHPTO and MIHSTO timeout default values for all device types supported by the system. The text records from the IECIOSxx member are converted into internal text records called DEV blocks in step 106 which creates one DEV block for each device MIH value written in IECIOSxx and they are chained together and anchored from an MIH processing work area 113. Later on in system initialization, when all the system services are available for use, MIH initialization continues at step 107 by processing each DEV block and creating the internal data structures necessary to enforce the MIH timeouts specified by the customer in step 114.

After all of the customer specified time intervals have been processed for system initialization step 107, those devices that did not have their MIH timeout values modified by the customer have the default PRIMARY MIH timeout values processed in step 108. This processing consists of building DEV blocks to represent the devices in step 115 and inputting them to step 114 that processes the DEV blocks with the customer input.

Figure 3B:
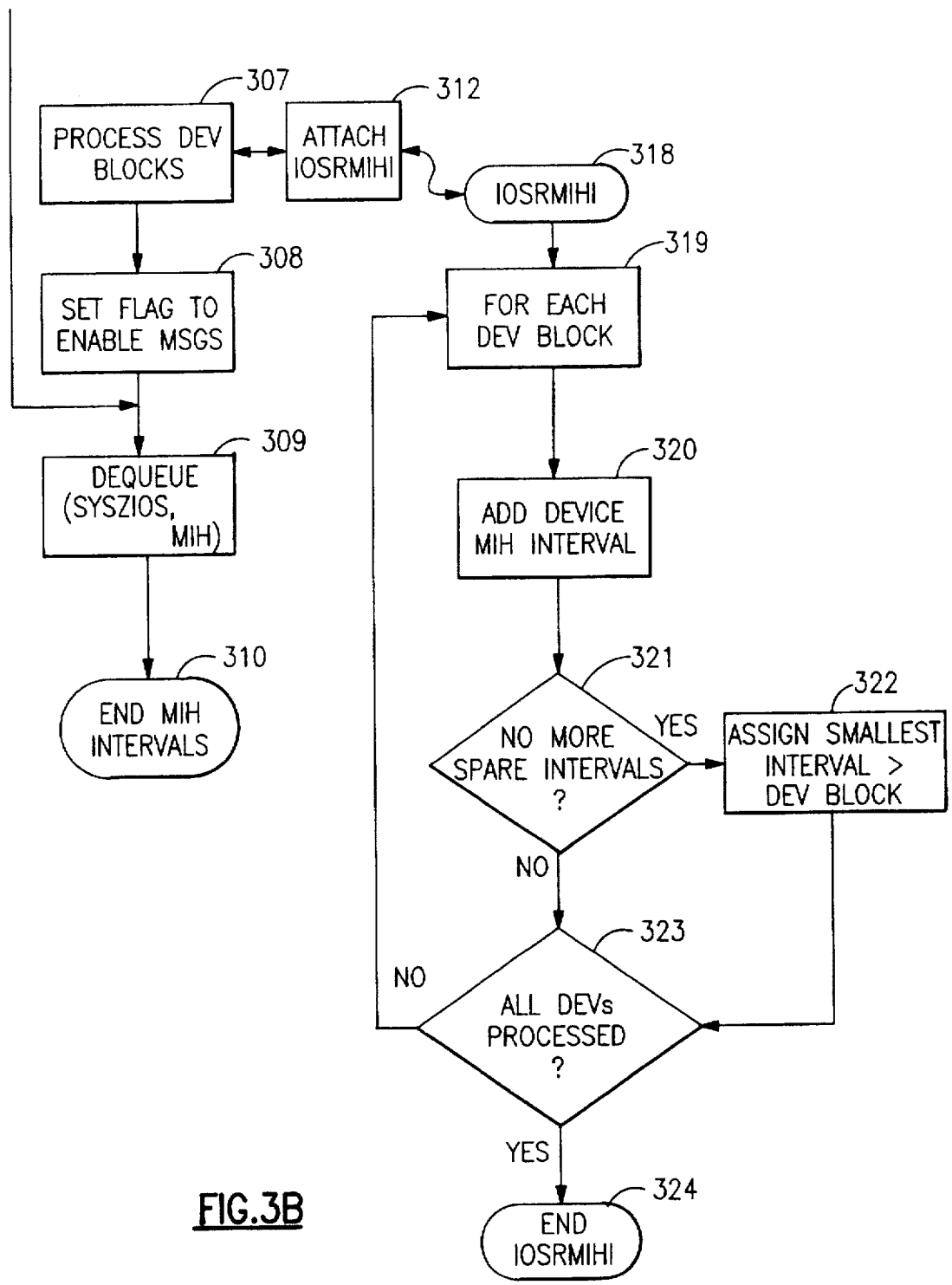
FIG. 3 is a flow chart showing a control flow for the MIH initialization processing.

The details of the process of creating these DEV blocks with the MIH timeout values are shown in FIG. 3. The Device MIH Interval processing is entered at step 301 during system initialization or from a VARY device process to be described later. Step 302 enqueues the device block to serialize its access against other MIH processing that could be the result from other MVS commands, such as SET IOS=xx and SETIOS MIH, . . . that modify the MIH processing for the devices. Once the system enqueue is obtained, each device in the system is examined (303) to determine if the installation already specified an MIH interval in IECIOSxx (102). If the customer did already specify an interval (311) then processing continues to the next device (304). However, if the customer did not specify an MIH interval then the MIH primary timeout value is retrieved (313) for that device from the configuration data table (112). If the MIH primary timeout value is not zero (314) then a DEV block is built to represent the device (315). The DEV block is then anchored onto a global queue of DEV blocks (316) and processing continues to the next device in the system (304). Once all the devices in the system have been processed a check is made to see if any DEV blocks have been created (305). If no DEV blocks have been created then processing terminates by freeing the MIH enqueue (309) by dequeuing it, and returning control to the caller (310).

However, when DEV blocks have been queued in step 302, then they are processed by first setting a flag so that all message processing is skipped (306). Message processing is skipped because these MIH changes are not from an explicit customer command. Next, the MIH Initialization process (IOSRMIHI) is invoked at step 312 to process the queued DEV blocks in the same way that customer specified MIH intervals are processed (318). After the IOSRMIHI completes processing, message processing is enabled again (308), the MIH enqueue is released (309) and control is returned to the caller (310).

With this invention, the MIH timeout values (MIHPTO and MIHSTO) may be uniquely assigned to each device. It is expected that values other than the OS defaults will be commonly used. If more unique MIH timeout values are used for the devices than the OS can support (MVS can support 256 unique MIH timeout values) then special processing is needed to handle the devices. In MVS, if no more unique MIH scan interval is available (step 321), then MVS assigns the smallest available interval greater than the value requested by the device (322). This insures that I/O operations are not prematurely terminated while providing the most responsive time for detecting device failures. If there are no intervals available greater than the primary MIH timeout value contained in the DEV block, then the default MIH time for the device class is used.

Once system initialization completes (109) the system can modify the configuration table by adding new devices or simply issuing the MVS VARY device command to bring offline devices online (117). Whenever offline devices are brought online, they undergo the same device initialization process (201 in FIG. 1, and all of FIG. 2) that was performed during system initialization and described in FIG. 2. After the device initialization process is done, DEV blocks are created and processed in the same way they were processed during system initialization (FIG. 1).

Once the Operating System is initialized and jobs begin to run on the system, I/O requests are issued by the OS to its I/O supervisor for execution at the device, and are timed by the Missing Interrupt Handler subcomponent of the type described in prior U.S. Pat. No. 5,388,254.

Three new fields are added to the operating system's internal representation for each device implementing this invention:

Long busy indicator:

A bit indicating that the last I/O request to the device encountered a long busy indication (unit check with sense data). Long busy is a signal from the device issued when the device is executing a command chain that contains a long running command or when the subsystem enters a processing state that will take a long time and that precludes the subsystem from accepting any commands while it is busy.

LBREDRIVE indicator:

A bit indicating that while in the long busy state an I/O request was re-issued by the OS to the device after the elapsed time was greater than the MIHSTO value.

Accumulated MIH time:

A field representing the total time that a device remains in the long busy state (this elapsed time starts when the long busy indicator is set for the device.

Figure 4A:
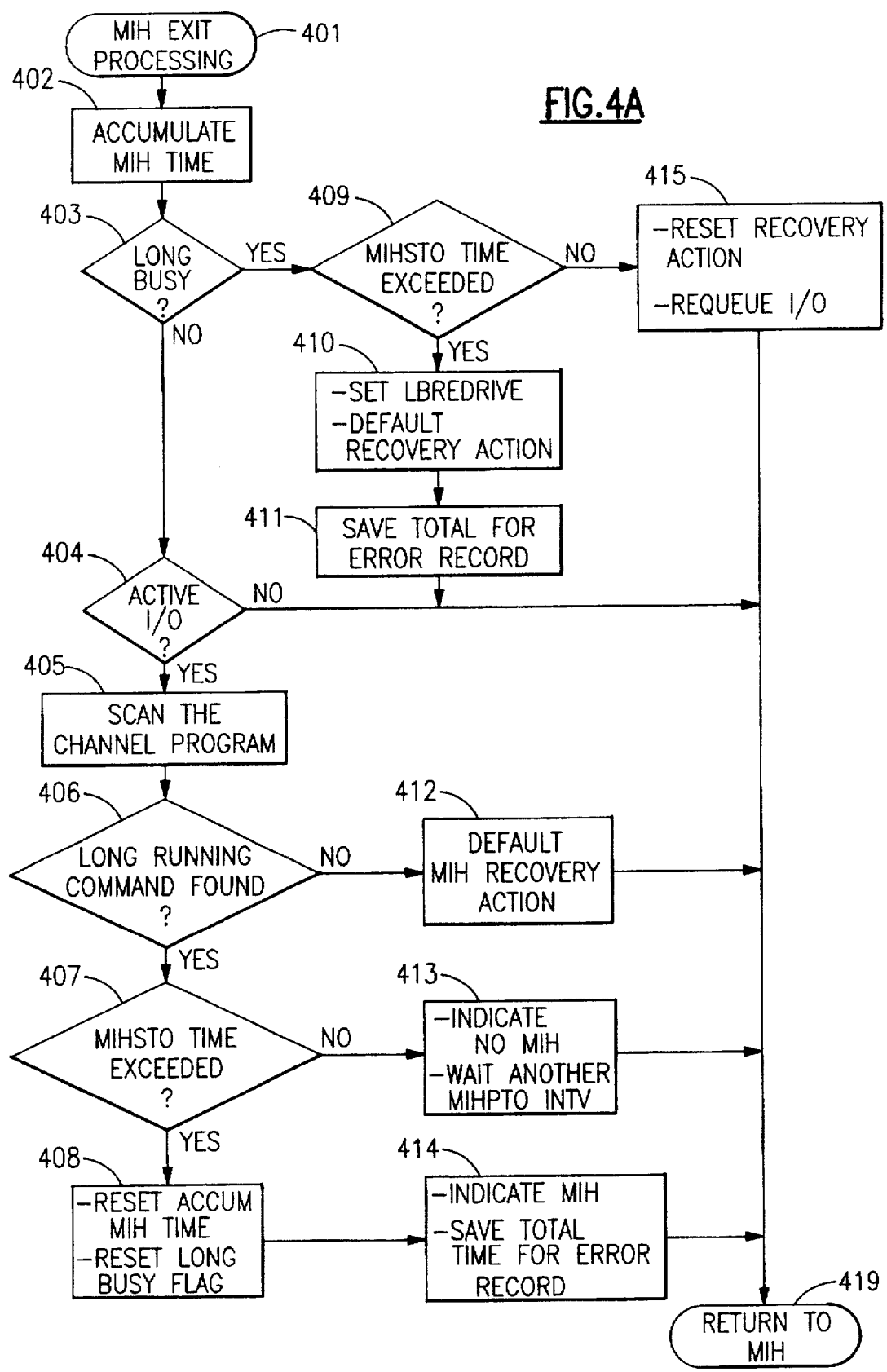
FIGS. 4a, 4b, 4c, 4d and 4e provide flow charts showing control flows in software processing for handling device dependent MIH processing for LONG-BUSY conditions, including detecting MIH timeout conditions.

In the OS when the primary MIH time interval has expired (accumulated time>MIHPTO) for an active or queued I/O request, OS considers the device eligible for MIH recovery and exits to device dependent MIH Exit processing shown in FIG. 4a. The MIH exit is entered at step 401 after the primary time interval has expired. Step 402 accumulates the total elapsed time that the I/O request is pending at the device. Step 403 tests if the device is indicated in the LONG BUSY state (while the I/O request remains queued and not active), then the total accumulating time is compared to the MIHSTO time for the device (409). If the MIHSTO time is exceeded, then step 410 turns on the LBREDRIVE bit to indicate that MIH has been entered to redrive the request, and step 410 goes back to MIH to restart the queued request after step 411 saves the total time accumulated for the request for an error record recorded in the system error log by MIH.

If the total accumulated time has NOT exceeded the MIHSTO timeout interval, step 415 is performed which resets the error recovery action, requeues the I/O request for reissue, and returns to the MIH process.

If step 403 finds the device is not in the long busy state and step 404 finds an active channel program, then step 405 scans the channel program to determine if it contains any long running command. The following are examples of long running commands for controlling an IBM 3590 tape device:

REWIND, FORWARD SPACE FILE, BACKWARD SPACE FILE, LOCATE BLOCK, FORMAT, ERASE, DATA SECURITY ERASE, UNLOAD, LOAD, MOVE

If a long running command is not found in the I/O request's program, step 412 requests normal MIH recovery. However, if a long running command was found by step 406, the total accumulated time is compared to the MIHSTO value. Step 407 determines if the accumulated time exceeds the MIHSTO value. If the value is not exceeded, step 413 indicates that the MIH processor wait another MIH interval (MIHPTO), before returning to the MIH Device Dependent Exit. If while the MIH processor is waiting for another MIH interval to elapse the channel program completes the MIH Device Dependent Exit will not be reentered for this I/O. But if step 407 finds the total accumulated time does exceed the MIHSTO, step 414 then resets to zero the total accumulated time, resets the long busy flag, and saves the total accumulated time in an error recovery record. The MIH process is reentered.

Figure 4B:
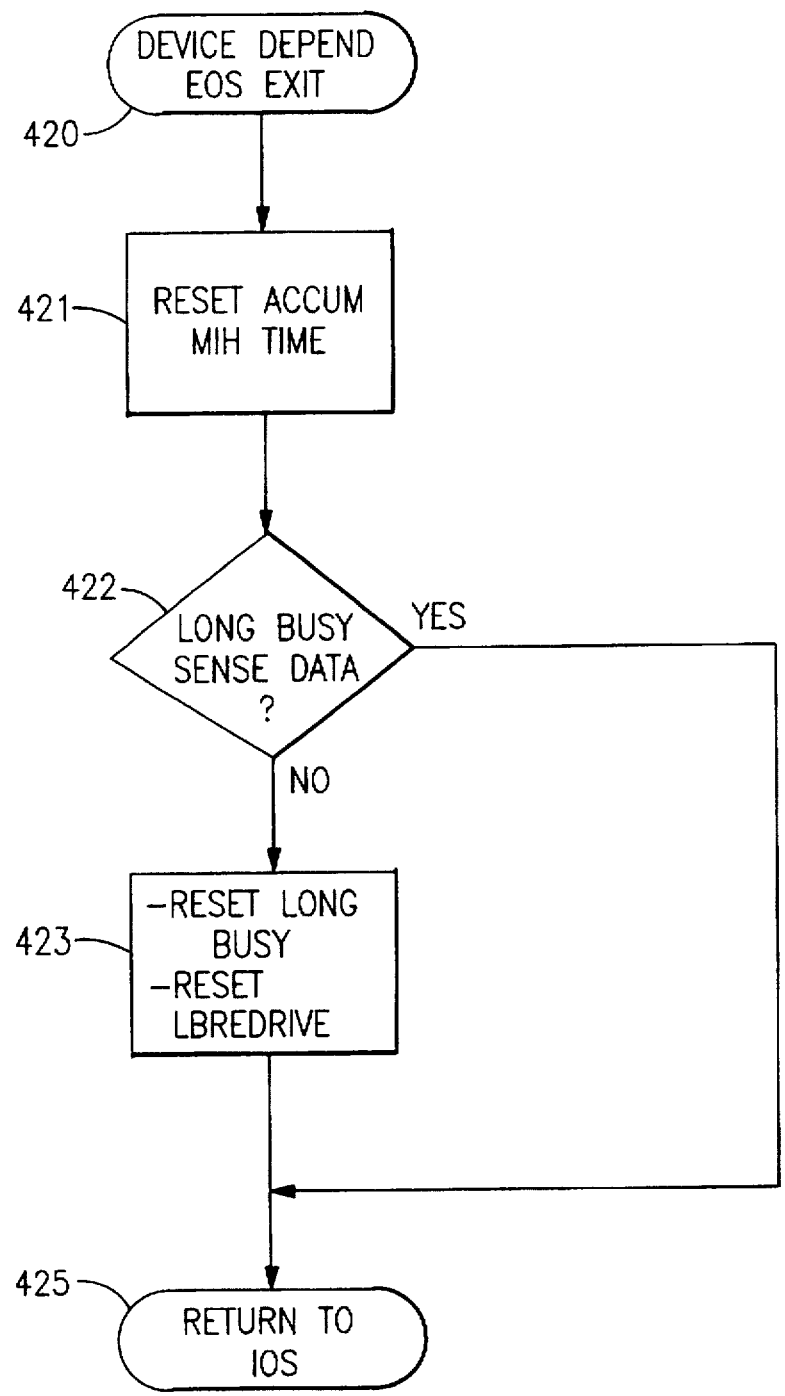
Figure 4C:
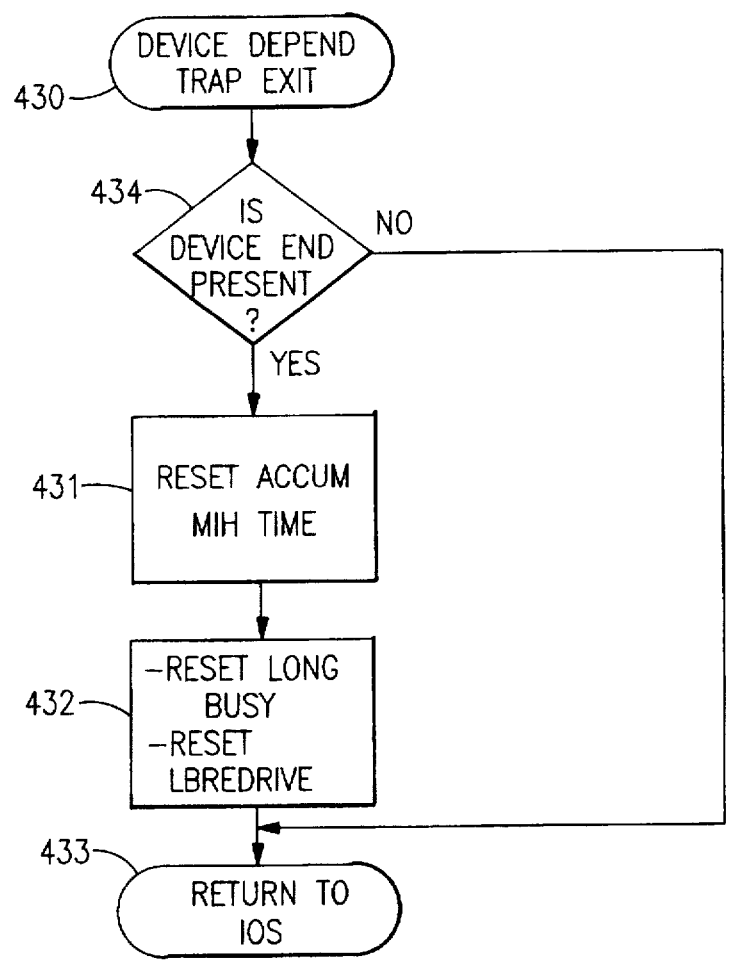

Any time an active I/O request completes, the process shown in FIG. 4b or FIG. 4c is used to reset the accumulated time to zero and to reset any long busy indication for the device, and resets the LBREDRIVE flag. FIG. 4b represents a device dependent End-of-Sense (EOS) Exit which processes a device end signal when unit check is also present for a device completing the I/O request. In this process, step 421 is invoked after the sense data has been read to reset to zero the total accumulated time for the request. Step 422 tests for existence of a "long busy" indication associated with the sense signal. If step 422 does not find long busy sense data, then step 423 resets the long busy indication for the device, and resets the LBREDRIVE flag. If step 422 finds long busy sense data or after step 423, a return is made to the IOS (I/O System) software in the OS which contains the MIH routine that controls the MIH operations for the OS.

A device dependent trap exit routine (430) in the MIH process is represented in FIG. 4c, and this trap control process gets control whenever a device completes and provides a device end signal without unit check. Then, step 431 resets to zero the total accumulated time for the request, and step 423 resets any long busy indication for the device, and resets the LBREDRIVE flag, and a return is made to IOS.

Figure 4D:
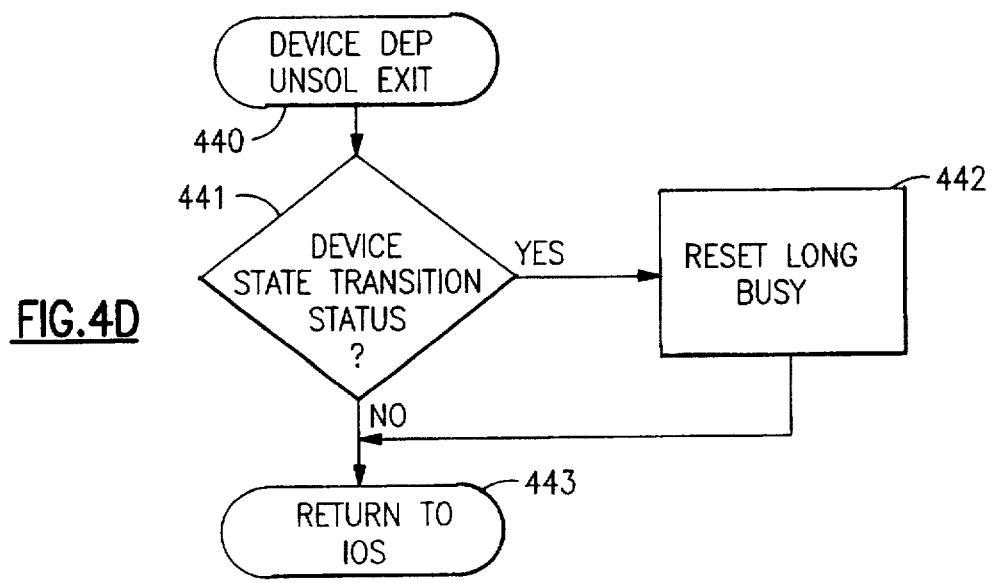

Any time an unsolicited interrupt occurs for a device, the device dependent Unsolicited Interrupt Exit (Device Dep Unsol Exit) code is entered at step 440 shown in FIG. 4d. If the next step 441 finds the status for the interrupt indicates a device state change has occurred, step 442 resets the long busy indicator.

Figure 4E:
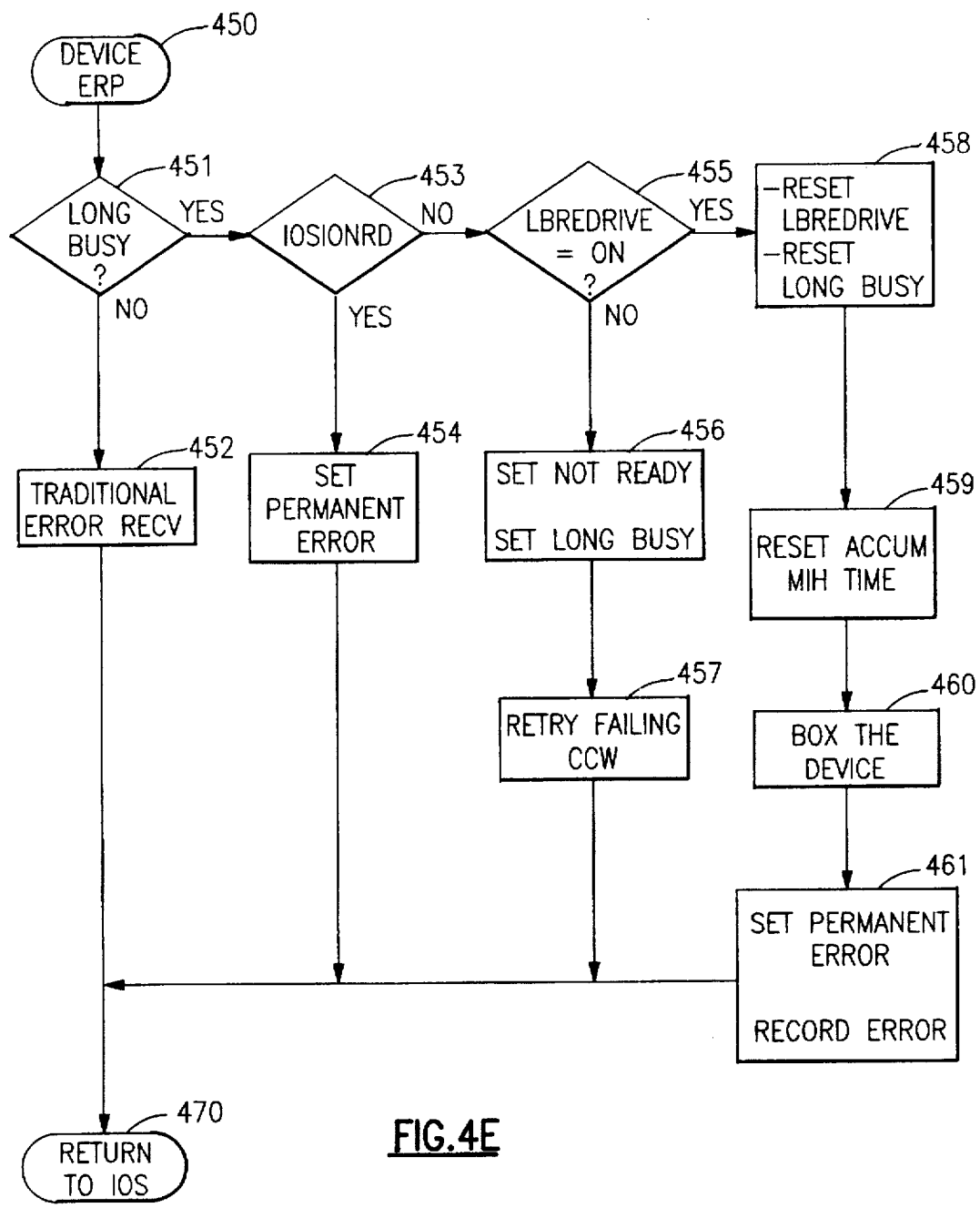

When an I/O request encounters an error, a device dependent Error Recovery Procedure (Device ERP) is invoked, which is shown in FIG. 4e. Step 451 determines if the I/O error was caused by a long busy condition, and if not, step 452 performs traditional error recovery processes in step 452, which may include retrying the I/O operation, and returns to IOS. If, however, step 451 finds the error was due to a long busy condition, then the I/O request is checked to see if it needs to execute even if the device is not ready by performing step 453. If the I/O does need to execute to satisfy the ERP, then step 454 marks the I/O request in permanent error and the job is posted in step 470. If the I/O does not require execution when the device is not ready, the LBREDRIVE bit is checked in step 455 to see if the request was redriven from MIH. If the request was redriven from MIH and is still in the long busy state—then the device is considered to be in permanent error. In steps 458 and 459 the long busy indicator and LBREDRIVE flags, and total accumulated times are reset. The device is then forced offline and marked such that all new I/O requests are rejected with a permanent I/O error by step 460. Finally, the current I/O request is marked with a permanent error by step 461, and the job posted in step 470. If the LBREDRIVE flag was not on, then step 456 marks the device as being in the long busy state so that a retry of the failing channel program by step 457 will stayed queued inside of IOS, waiting for the long busy to subside (FIG. 4d), and monitored by MIH to cap the total long busy time (FIG. 4a), described above.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

Having thus described our invention, what we claim as new and desire to secure by Letters Patent is:

1. A method of avoiding false detection of missing I/O interrupt signals by an operating system (OS) for use in a computer arrangement having at least one OS and a missing interrupt handler (MIH) process for detecting a potentially failed input/output (I/O) device operation for an I/O request issued by the OS to an I/O subsystem, the MIH process comprising the steps of:

sending by the OS to the I/O subsystem a first I/O request and a second I/O request, the first I/O request associated with a first I/O program containing at least one command for controlling an I/O device, the second I/O request associated with a second I/O program containing at least one command for controlling the I/O device, operating the I/O device under control of the first I/O program for the first I/O request, delaying operation of the second I/O request in the I/O subsystem because of the I/O device currently operating for the first I/O request, measuring MIH time for a primary MIH timeout period starting when the second I/O request is made to wait by the I/O subsystem, signalling a device-completion interrupt to the OS when and if the I/O device successfully completes operation for the first I/O request, terminating the measurement step if the device-completion interrupt for the first I/O request is received by the OS before measuring the end of the primary MIH timeout period, but scanning the first I/O program for a long command requiring the I/O device to operate for an excessive amount of time if no device-end interrupt is received by the OS before measuring the end of the primary MIH timeout period, continuing measuring the MIH time for a secondary MIH timeout period if the scanning step finds the long command in the first I/O program, and terminating the continuing measuring step if the device-completion interrupt for the first I/O request is received by the OS before the measuring step indicates the end of the secondary MIH timeout period.

2. An MIH process as defined in claim 1, further comprising the step of:

enabling the second I/O program to operate the I/O device for the second I/O request in response to the step of terminating the continuing measuring step.

3. An MIH process as defined in claim 1, further comprising the step of:

indicating a MIH potential error condition for the operation of the I/O device if the continuing measuring step indicates the end of the secondary MIH timeout period when the OS has not received the device-completion interrupt.

4. An MIH process as defined in claim 3, further comprising the step of:

invoking an I/O error recovery program for the first I/O request if the MIH potential error condition is indicated by the indicating step.

5. An MIH process as defined in claim 4, further comprising the step of:

retrying the first I/O request in response to the step of invoking the I/O error recovery program for the first I/O request.

6. An MIH process as defined in claim 1, further comprising the step of:

releasing I/O resources used by the first I/O request at least by the time the continuing measuring step indicates an end to the secondary MIH timeout period.

7. An MIH process as defined in claim 1, in which the computer arrangement has a plurality of OSs, the method further comprising the steps of:

setting a busy indicator in an I/O controller when any I/O program is accepted by the I/O controller for operation of the I/O device, detecting in the I/O controller when operation time for the I/O device for a current request exceeds a predetermined threshold time in relation to a waiting I/O request from the OS.

setting a long-busy indicator in the I/O controller when the threshold time is exceeded.

signalling a long-busy interrupt by the I/O controller to each OS having an I/O request waiting in the I/O subsystem to indicate to each OS that a current I/O request is operating a long time on the device, receiving by each OS the long-busy interrupt signal before an end of the primary MIH timeout period is measured, and continuing measuring by each OS the MIH time for the secondary MIH timeout period in response to the long busy interrupt signal being received prior to the end of the primary MIH timeout period.

* * * * *